United States Patent
Szarski et al.

(10) Patent No.: US 10,625,419 B2
(45) Date of Patent: Apr. 21, 2020

(54) ROBOTIC SYSTEM AND METHOD FOR OPERATING ON A WORKPIECE

(71) Applicant: The Boeing Company, Chicago, IL (US)

(72) Inventors: Martin A. Szarski, Brighton East (AU); Dominic Wierzbicki, Melbourne (AU); Phillip James Haeusler, Melbourne (AU)

(73) Assignee: The Boeing Company, Chicago, IL (US)

( * ) Notice: Subject to any disclaimer, the term of this patent is extended or adjusted under 35 U.S.C. 154(b) by 268 days.

(21) Appl. No.: 15/927,994

(22) Filed: Mar. 21, 2018

(65) Prior Publication Data
US 2019/0291275 A1 Sep. 26, 2019

(51) Int. Cl.
*B25J 9/16* (2006.01)
*B25J 11/00* (2006.01)
(Continued)

(52) U.S. Cl.
CPC ............. *B25J 9/1666* (2013.01); *B25J 9/162* (2013.01); *B25J 9/1669* (2013.01); *B25J 9/1671* (2013.01);
(Continued)

(58) Field of Classification Search
CPC ........ B25J 9/1666; B25J 9/167; B25J 9/1669; B25J 9/1671; B25J 9/1697; B25J 9/0085; B25J 9/163; B25J 9/1602; Y10S 901/01; Y10S 901/09; Y10S 901/47; Y10S 901/49; G05D 11/0085; G05D 19/4097;
(Continued)

(56) References Cited

U.S. PATENT DOCUMENTS

| 4,697,239 A | 9/1987 | Sicard et al. |
| 5,407,415 A * | 4/1995 | Spishak ............. G05B 19/4182 219/121.82 |

(Continued)

FOREIGN PATENT DOCUMENTS

WO    WO9942257    8/1999

OTHER PUBLICATIONS

Tan et al., An integrated robotic system for transporting surgical tools in hospitals, 2016, IEEE, pp. 1-8 (Year: 2016).*

(Continued)

*Primary Examiner* — McDieunel Marc

(57) ABSTRACT

A robotic system includes a robot and a processor configured to autonomously generate a master plan for movement of an end effector of the robot for operating on an operating surface of a workpiece in a physical environment. The master plan is based on a computer aided design (CAD) model of the workpiece and defines movement paths of the end effector based on a reach distance of a robotic arm of the robot at each of a plurality of working waypoints defined in the master plan and corresponding to fiducial markers on the workpiece. The processor registers the robot to the workpiece, iteratively adjusts an approximate workpiece position in a world map until matching an actual workpiece position in the physical environment, and constructs and executes a robotic arm trajectory causing the end effector to operate on the operating surface along the movement paths defined in the master plan.

20 Claims, 21 Drawing Sheets

(51) Int. Cl.
*G05D 1/02* (2020.01)
*G05B 19/4097* (2006.01)

(52) U.S. Cl.
CPC ......... *B25J 9/1697* (2013.01); *B25J 11/0085* (2013.01); *G05D 1/0214* (2013.01); *G05B 19/4097* (2013.01); *Y10S 901/01* (2013.01); *Y10S 901/09* (2013.01); *Y10S 901/47* (2013.01); *Y10S 901/49* (2013.01)

(58) Field of Classification Search
CPC ............ G05B 19/4086; G05B 19/4068; G05B 19/41815; G05B 19/4069; G05B 19/4182; B23K 37/0461; B23K 31/00; B23K 9/0206; B23K 9/1062
See application file for complete search history.

(56) References Cited

U.S. PATENT DOCUMENTS

| | | | | |
|---|---|---|---|---|
| 5,808,432 | A * | 9/1998 | Inoue | G05B 19/4069 318/561 |
| 5,930,460 | A * | 7/1999 | Noumaru | G05B 19/41815 700/245 |
| 6,107,768 | A * | 8/2000 | Ouchi | G05B 19/4068 318/568.1 |
| 6,486,439 | B1 * | 11/2002 | Spear | B23K 9/1062 219/136 |
| 6,750,426 | B2 * | 6/2004 | Veikkolainen | B23K 9/0206 219/124.34 |
| 7,034,249 | B2 * | 4/2006 | Gustafsson | B23K 37/0461 219/124.34 |
| 7,102,098 | B2 * | 9/2006 | Rouault | B23K 31/00 219/130.5 |
| 8,024,068 | B2 * | 9/2011 | Gray | B25J 9/1602 382/153 |
| 8,725,283 | B2 * | 5/2014 | Gray | G05B 19/4086 700/186 |
| 9,102,055 | B1 * | 8/2015 | Konolige | B25J 9/163 |

OTHER PUBLICATIONS

Backes et al., Automated rover positioning and instrument placement, 2015, IEEE, pp. 1-12 (Year: 2015).*
Boopathy et al., An approach to robot off-line programming and simulation for flexible manufacturing systems, 1995, IEEE, pp. 461-466 (Year: 1995).*
Tao et al., Optimization on multi-robot workcell layout in vertical plane, 2011, IEEE, pp. 744-749 (Year: 2011).*
Jinno et al., Teaching-less robot system for finishing workpieces of various shapes using force control and computer vision, 1999, IEEE, pp. 573-578 (Year: 1999).*
Chung et al., Path generation of industrial robot for tracking surface of workpiece using CAD-based off-line programming, 2017, IEEE, pp. 345-346 (Year: 2017).*
Solvang et al., SAPIR: Supervised and Adaptive Programming of Industrial Robots, 2007, IEEE, pp. 281-286 (Year: 2007).*
Ricardo et al., Automatic Programming and Control for Robotic Deburring, 2016, IEEE, pp. 688-695 (Year: 2016).*
Luke Ross, "Fiducial Marker Navigation for Mobile Robots," available at <www.cs.ru.ac.za/research/g09r5654/downloads/thesis.pdf>, Nov. 2012.
EPO, Extended European Search Report for Appl. No. EP 19156504 dated Sep. 13, 2019.
Asama H. et al: "Functional distribution among multiple mobile robots in an autonomous and decentralized robot system", Proceedings of the International Conference on Robotics and Automation Sacramento, Apr. 9-11, 1991; [Proceedings of the International Conference on Robotics and Automation], Los Alamitos, IEEE Comp. Soc. Press, US, vol. Conf. 7, Apr. 9, 1991, pp. 1921-1926.

* cited by examiner

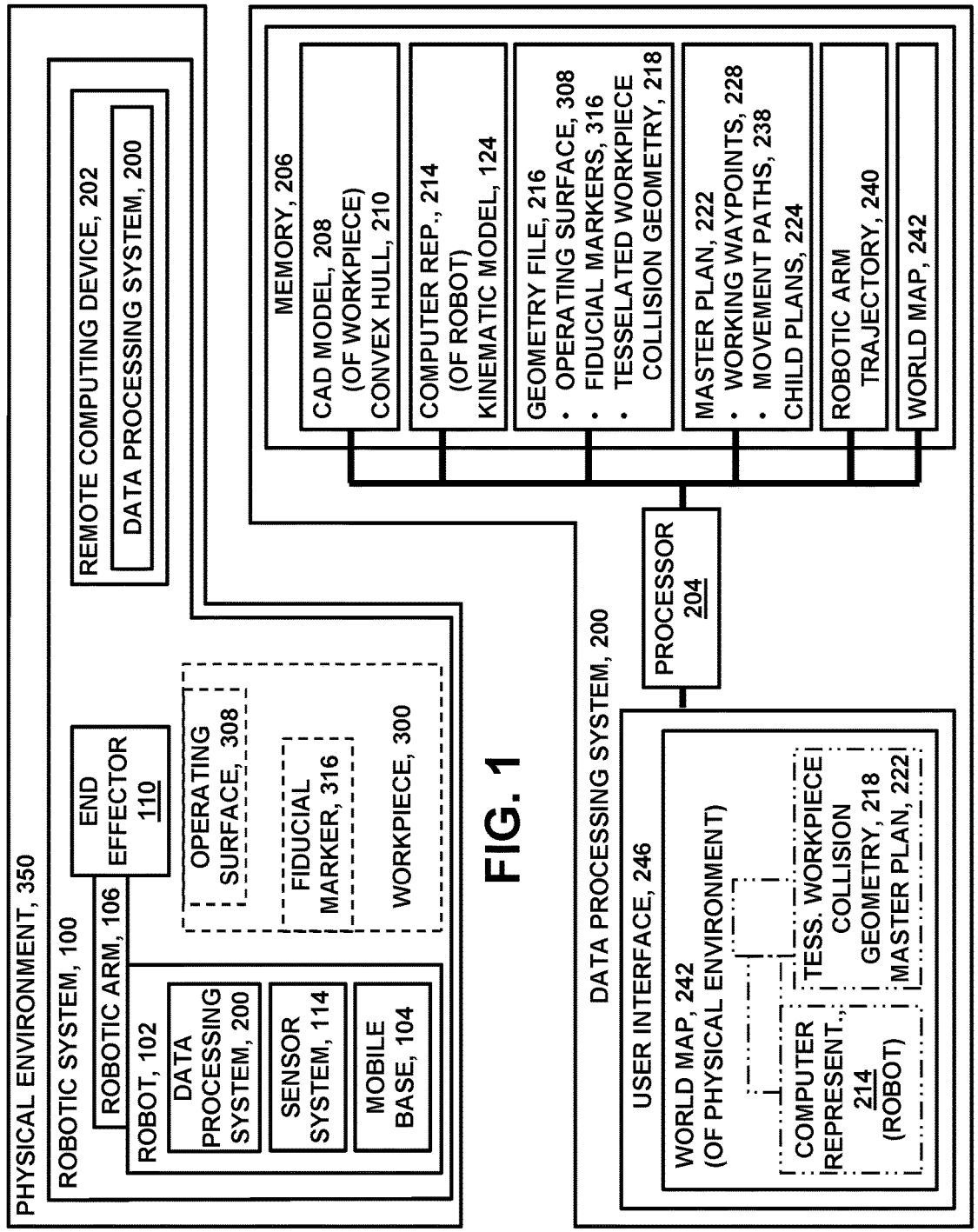

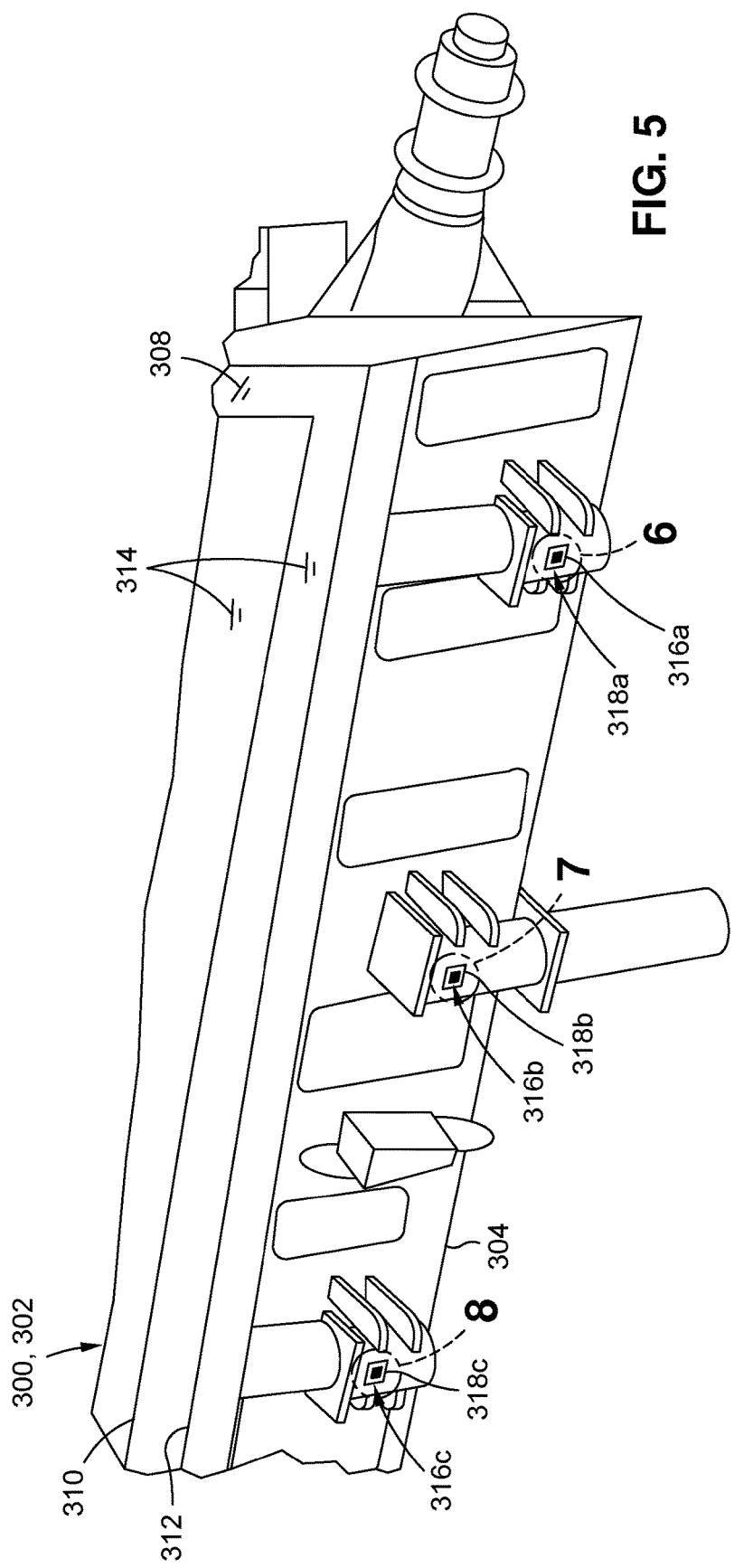
FIG. 5
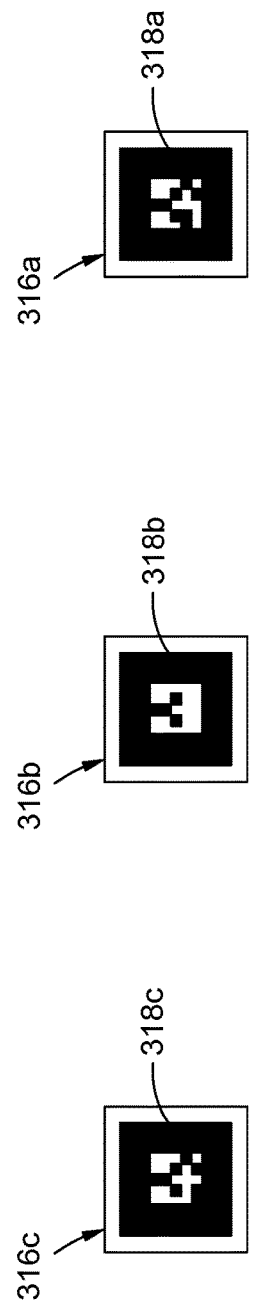

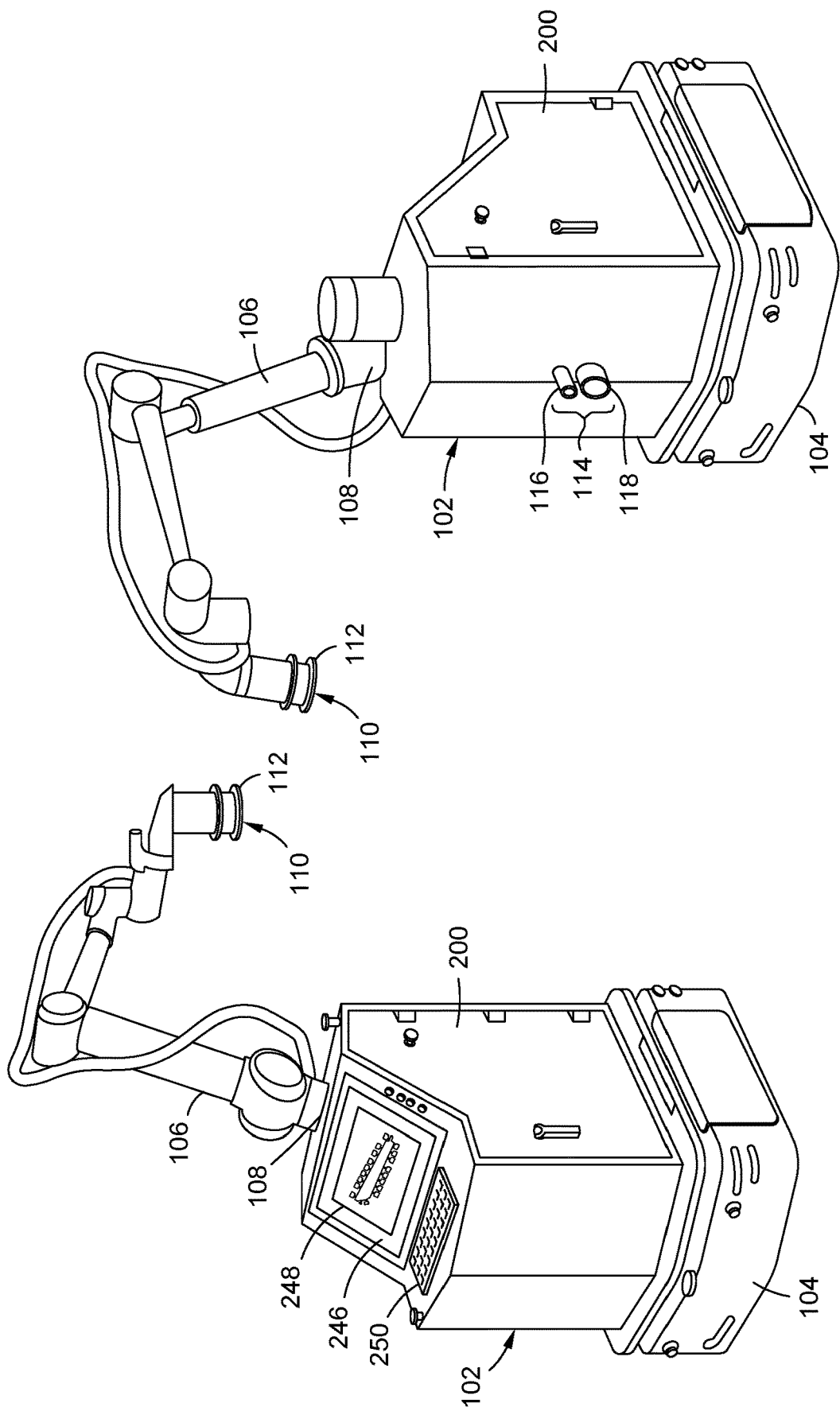

ROBOTIC SYSTEM AND METHOD FOR OPERATING ON A WORKPIECE

FIELD

The present disclosure relates generally to robotic systems and, more particularly, to a system and method for autonomously operating on a workpiece using one or more mobile robots.

BACKGROUND

The manufacturing of composite parts in a production program may involve laying up composite plies on a layup surface of a layup mandrel. Each time a composite part is laid up, the layup surface must first be cleaned to remove contaminants such as baked-on resin, adhesive, sealing chemicals, and/or other consumables that may be present from previous uses of the layup mandrel. Cleaning of the layup surface may be manually performed by a technician using a handheld orbital sander. However, for large layup mandrels, manual cleaning is a time-consuming process.

Automated approaches have been developed to reduce the amount of time required for layup mandrel cleaning. One approach requires the construction of a mandrel cleaning room that is built and commissioned to the size of the largest layup mandrel to be cleaned. Unfortunately, the construction of a dedicated mandrel cleaning room represents a significant non-recurring cost to a production program. Some cleaning techniques avoid the need for a dedicated mandrel cleaning room by installing a mandrel cleaning station on the shop floor of a production facility. However, for large layup mandrels, the infrastructure requirements are still significant and may include the need to install a foundation or track system for transporting and supporting such large layup mandrels. In addition, the floor space occupied by a mandrel cleaning station detracts from the amount of floor space available for existing manufacturing systems of the production facility.

Other automated approaches are limited in their ability to clean layup mandrels of more than one size or configuration. In addition, some approaches require the permanent installation of a cleaning cell including an overhead gantry and fencing to permit the cleaning of large layup mandrels. Furthermore, some automated approaches require a manually customized cleaning process for each unique mandrel configuration and which results in significant labor costs.

As can be seen, there exists a need in the art for a system and method for cleaning a layup mandrel that avoids the need for a dedicated cleaning room and/or associated infrastructure, and which is reconfigurable or scalable for different layup mandrel sizes and configurations and which does not require a manually customized cleaning process for each unique mandrel configuration. In addition to cleaning layup mandrels, the system and method is preferably capable of performing a variety of different types of operations on a variety of different types of workpieces.

SUMMARY

The above-noted needs associated with performing operations on workpieces are specifically addressed by the present disclosure which provides a robotic system for autonomously operating on a workpiece. The robotic system includes at least one robot communicatively coupled to a data processing system including a processor. The robot as a robotic arm and an end effector coupled to the robotic arm.

The processor is configured to autonomously generate a master plan for movement of the end effector for operating on an operating surface of a workpiece positioned in a physical environment. The master plan is based on a computer aided design (CAD) model of the workpiece and defines movement paths of the end effector based at least in part on a reach distance of the robotic arm of the robot at each of a plurality of working waypoints included in the master plan and corresponding to a plurality of fiducial markers mounted on the workpiece and represented in the CAD model.

The processor is configured to autonomously perform the following sequence of steps for each one of the fiducial markers: register the robot to the workpiece in the physical environment when the robot is driving toward and/or is at an approach waypoint in front of a fiducial marker, and iteratively adjust a position of a tessellated workpiece collision geometry within a world map of the physical environment unless or until an approximate workpiece position of the tessellated workpiece collision geometry within the world map substantially matches an actual workpiece position in the physical environment when the robot is driving toward and/or is at the working waypoint corresponding to the fiducial marker; construct, with the robot at the working waypoint, a robotic arm trajectory for performing a sequence of movements of the end effector along the movement paths associated with the working waypoint, and execute the robotic arm trajectory and cause the end effector to operate on a portion of the operating surface of the workpiece corresponding to the portion of the master plan defined for the robot at the working waypoint.

In a further example, the robotic system includes a plurality of robots each having a robotic arm and an end effector coupled to the robotic arm. As mentioned above, the robotic system includes at least one processor configured to autonomously generate a master plan for movement of each end effector for operating on an operating surface of a workpiece positioned in a physical environment. The master plan is based on a CAD model of the workpiece and comprises a plurality of child plans for distribution to the plurality of robots. Each one of the child plans defines movement paths of an end effector of one of the robots. As mentioned above, the movement paths are based at least in part on the reach distance of a robotic arm of the robot assigned by the child plan to one of more of a unique set of working waypoints included in the master plan. As mentioned above, the working waypoints correspond to a plurality of fiducial markers mounted on the workpiece and represented in the CAD model.

For the robotic system having a plurality of robots, the processor is configured to autonomously register each one of the robots to the workpiece when the robot is driving toward and/or is at an approach waypoint in front of a working waypoint of the set of working waypoints assigned to the robot. For only one of the robots when driving toward and/or at a first one of the working waypoints in the set of working waypoints, the processor is configured to iteratively adjust the position of the tessellated workpiece collision geometry within the world map unless or until the approximate workpiece position of the tessellated workpiece collision geometry within the world map substantially matches an actual workpiece position in the physical environment when the robot is at the working waypoint. In addition, for each one of the robots when at each working waypoint in the set of working waypoints assigned to the robot, the processor is configured to construct a robotic arm trajectory for performing a sequence of movements of the end effector along the movement paths associated with the working waypoint, and execute the robotic arm trajectory in a manner causing the end effector to operate on a portion of the operating surface corresponding to the portion of the child plan defined for the robot at the working waypoint.

Also disclosed is a method of operating on a workpiece. The method includes autonomously generating, using a processor, a master plan for movement of at least one end effector correspondingly of at least one robot for operating on an operating surface of a workpiece in a physical environment. As mentioned above, the master plan is based on a CAD model of the workpiece and defines movement paths of the end effector based at least in part on the reach distance of the robotic arm of the robot at each of a plurality of working waypoints included in the master plan. As mentioned above, the plurality of working waypoints correspond to the plurality of fiducial markers mounted on the workpiece and represented in the CAD model. The method further includes autonomously performing, using the processor, the following sequence of steps for the robot at each one of the plurality of working waypoints: registering the robot to the workpiece in the physical environment when the robot is driving toward and/or is at an approach waypoint in front of a working waypoint, and iteratively adjusting a position of a tessellated workpiece collision geometry within a world map of the physical environment unless or until an approximate workpiece position of the tessellated workpiece collision geometry within the world map substantially matches an actual workpiece position in the physical environment when the robot is driving toward and/or is at the working waypoint; constructing, with the robot at the working waypoint, a robotic arm trajectory for performing a sequence of movements of the end effector along the movement paths associated with the working waypoint; and executing the robotic arm trajectory in a manner causing the end effector to operate on a portion of the operating surface corresponding to the portion of the master plan defined for the robot at the working waypoint.

In an implementation of the method using a plurality of robots, the method includes autonomously generating, using a processor, a master plan for movement of a plurality of end effectors of the corresponding plurality of robots configured to operate on different surface segments of an operating surface of a workpiece positioned in a physical environment. As mentioned above, the master plan is based on a CAD model of the workpiece and comprises a plurality of child plans for distribution correspondingly to the plurality of robots. Each one of the child plans defines movement paths of an end effector of one of the robots. As noted above, the movement paths are based at least in part on a reach distance of a robotic arm of the robot assigned by the child plan to operate from a unique set of working waypoints included in the master plan. As also noted above, the working waypoints correspond to the fiducial markers mounted on the workpiece and represented in the CAD model.

Implementation of the method using a plurality of robots further includes autonomously performing, using the processor, the following: registering each one of the robots to the workpiece in the physical environment when driving toward and/or at an approach waypoint in front of a working waypoint of the set of working waypoints assigned to the robot; iteratively adjusting, for only one of the robots when at a first one of the working waypoints in the set of working waypoints, a position of a tessellated workpiece collision geometry within a world map of the physical environment unless or until an approximate workpiece position of the tessellated workpiece collision geometry within the world map substantially matches an actual workpiece position in the physical environment when the robot is driving toward and/or is at the working waypoint; constructing, for each one of the robots when at each working waypoint in the set of working waypoints assigned to the robot, a robotic arm trajectory for performing a sequence of movements of the end effector along the movement paths associated with the working waypoint; and executing, for each one of the robots when at each working waypoint in the set of working waypoints assigned to the robot, the robotic arm trajectory in a manner causing the end effector to operate on a portion of the operating surface corresponding to the portion of the child plan defined for the robot at the working waypoint.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a block diagram of an example of a robotic system having at least one robot for operating on an operating surface of a workpiece and optionally further including a remote computing device for generating a master plan for movement of an end effector of the robot for operating on the workpiece;

FIG. 2 is a block diagram of the data processing system of the robot and/or the remote computing device and having a processor for autonomously generating the master plan for movement of the end effector;

FIG. 5 is a magnified view of a portion of the workpiece illustrating three of the fiducial markers included with the workpiece;

FIG. 6 is an example of a first fiducial marker having a first identification pattern;

FIG. 7 is an example of a second fiducial marker having a second identification pattern different than the first identification pattern;

FIG. 8 is an example of a third fiducial marker having a third identification pattern different than the first identification pattern and the second identification pattern;

FIG. 9 is a front perspective view of an example of a robot mounted on a mobile base and including a robotic arm supporting an end effector;

FIG. 10 is a rear perspective view of the robot of FIG. 9 having a sensor system for navigation of the robot and registration of the robot to the workpiece;

DETAILED DESCRIPTION

Figure 3:
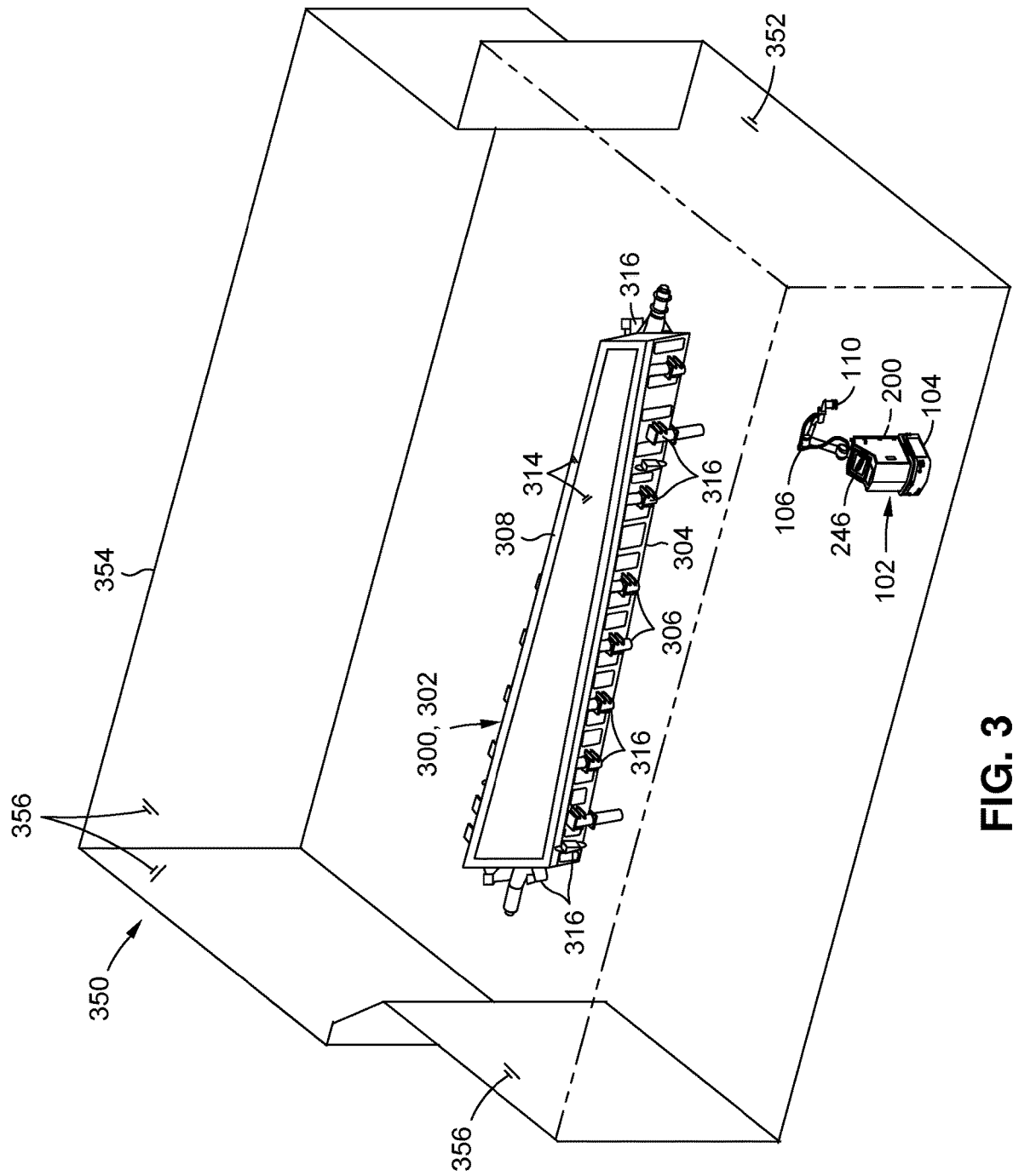
FIG. 3 is a perspective view of an example of a physical environment containing the workpiece and the robot.

Referring now to the drawings wherein the showings are for purposes of illustrating preferred and various embodiments of the disclosure, shown in FIG. 1 is a block diagram of an example of a robotic system 100 having at least one robot 102 for autonomously operating on an operating surface 308 of a workpiece 300 located in a physical environment 350 (FIG. 3). The robot 102 has a mobile base 104 which may be configured as an automatic guided vehicle for moving the robot 102 along a surface such as a floor of a production facility (e.g., the physical environment). The robot 102 has a robotic arm 106 and an end effector 110 coupled to the robotic arm 106. The end effector 110 may be configured to perform an operation on an operating surface 308 of the workpiece 300. In the present disclosure, the workpiece 300 is configured as a layup mandrel 302 (FIG. 3) having a layup surface 314 (FIG. 3) for laying up a composite part (not shown). The end effector 110 may be configured as an orbital buffer or sander, a dry ice blaster, a laser, or other device for cleaning the layup surface 314 (e.g., the operating surface 308) to remove contaminants (not shown) prior to laying up a composite part. However, the end effector 110 may be provided in any one a variety of different configurations for forming any one of a variety of different types of operations on any one of a variety of different types of workpieces 300, and is not limited to performing a cleaning operation on a layup surface 314 of a layup mandrel 302.

The robot 102 may additionally includes a sensor system 114 having a plurality of sensors such as lasers 116 (e.g., laser scanners) and/or cameras 118 of a camera-based machine vision system for navigation of the robot 102 around the workpiece 300 within the physical environment 350. The sensor system 114 may alternatively or additionally include radio-frequency sensors, ultrasonic sensors, and/or other types of sensors to facilitate navigation of the robot 102. The sensor system 114 is configured to detect fiducial markers 316 (e.g., FIGS. 4-5) on the workpiece 300, and transmit identification data and positional data regarding the fiducial markers 316 to the data processing system 200 for coordinating the movement of the robot 102 and the robotic arm 106 relative to the workpiece 300. The fiducial markers 316 may each include a unique identification pattern 318 (e.g., FIGS. 6-8) to facilitate registration of the robot 102 to the workpiece 300. The workpiece 300 may additionally include navigation aids (not shown) for the robot 102 such as reflective target icons, radio-frequency identification (RFID) target identifiers, magnetic reference points, or a combination thereof.

Referring to FIGS. 1-2, the robot 102 is communicatively coupled to a data processing system 200 for controlling the robot 102 including movement of the mobile base 104, the robotic arm 106, and the end effector 110. In some examples, the data processing system 200 may be integrated into the robot 102. In other examples, the data processing system 200 may be part of a remote computing device 202 configured to communicate (e.g., wirelessly) with the robot 102 for controlling the robot 102 for performing operations on the workpiece 300. The remote computing device 202 may be a mobile computing device such as a laptop computer, tablet, or other mobile computing device. Alternatively, the remote computing device 202 may be a stationary computing device such as a desktop computer or a personal computer. The remote computing device 202 may be in wireless communication with the robot 102 via antennas (not shown) mounted on the robot 102 and on the remote computing device 202.

In FIG. 2, the data processing system 200 includes a processor 204 and a memory 206 communicatively coupled to the processor 204. The processor 204 is configured to autonomously generate a master plan 222 defining the movements of the end effector 110 in operating on the operating surface 308 of the workpiece 300. The master plan 222 is generated from a geometry file 216 (e.g., STEP file) that is based on a computer aided design (CAD) model 208 of the workpiece 300 and which may be stored in the memory 206. The master plan 222 defines a plurality of working waypoints 228 corresponding to the plurality of fiducial markers 316 mounted on the workpiece 300. The master plan 222 also defines movement paths 238 (e.g., three-dimensional) of the end effector 110 for the robot 102 stationed at each of the working waypoints 228, and defines a sequence of movements of the end effector 110 along the movement paths 238 for the robot 102 at each working waypoint 228. The movement paths 238 of the end effector 110 are based at least in part on the reach distance of the robotic arm 106 relative to a center of rotation (not shown) of the robotic arm base 108 (FIGS. 9-10) which is mounted to the robot 102.

As described in greater detail below, the processor 204 is configured to autonomously perform the following sequence of steps for the robot 102 at each one of the fiducial markers 316: (1) autonomously register the robot 102 to the workpiece 300 in the physical environment 350 when the robot 102 is at an approach waypoint 226 in front of a working waypoint 228 corresponding to a fiducial marker 316, and iteratively adjust the position of tessellated workpiece collision geometry 218 in a world map 242 of the physical environment 350 unless or until an approximate workpiece position 244 (i.e., location and orientation) of the tessellated workpiece collision geometry 218 within the world map 242 substantially matches an actual workpiece position 306 (i.e., location and orientation) in the physical environment 350 when the robot 102 is at the working waypoint; (2) autonomously construct, with the robot 102 at the working waypoint 228, a robotic arm trajectory 240 for performing a sequence of movements of the end effector 110 along the movement paths 238 associated with the working waypoint; and (3) autonomously execute the robotic arm trajectory 240 causing the end effector 110 to perform the sequence of movements along the movement paths 238 and thereby operate on a portion of the operating surface 308 of the workpiece 300 corresponding to the portion of the master plan 222 defined for the robot 102 at the working waypoint 228.

FIG. 3 shows an example of a physical environment 350 containing an example of a workpiece 300 and a robot 102. The physical environment 350 may be part of a production facility. In the example where the workpiece 300 is a layup mandrel 302, the physical environment 350 may be a designated area of a composites manufacturing facility. Also shown in FIG. 3 is an example of a robot 102 which operates within the physical environment 350. As mentioned above, the robot 102 includes a mobile base 104 for translation of the robot 102 along a floor surface 352. In addition, the robot 102 includes a robotic arm 106 having an end effector 110 for performing operations on the operating surface 308 of the workpiece 300.

Figure 4:
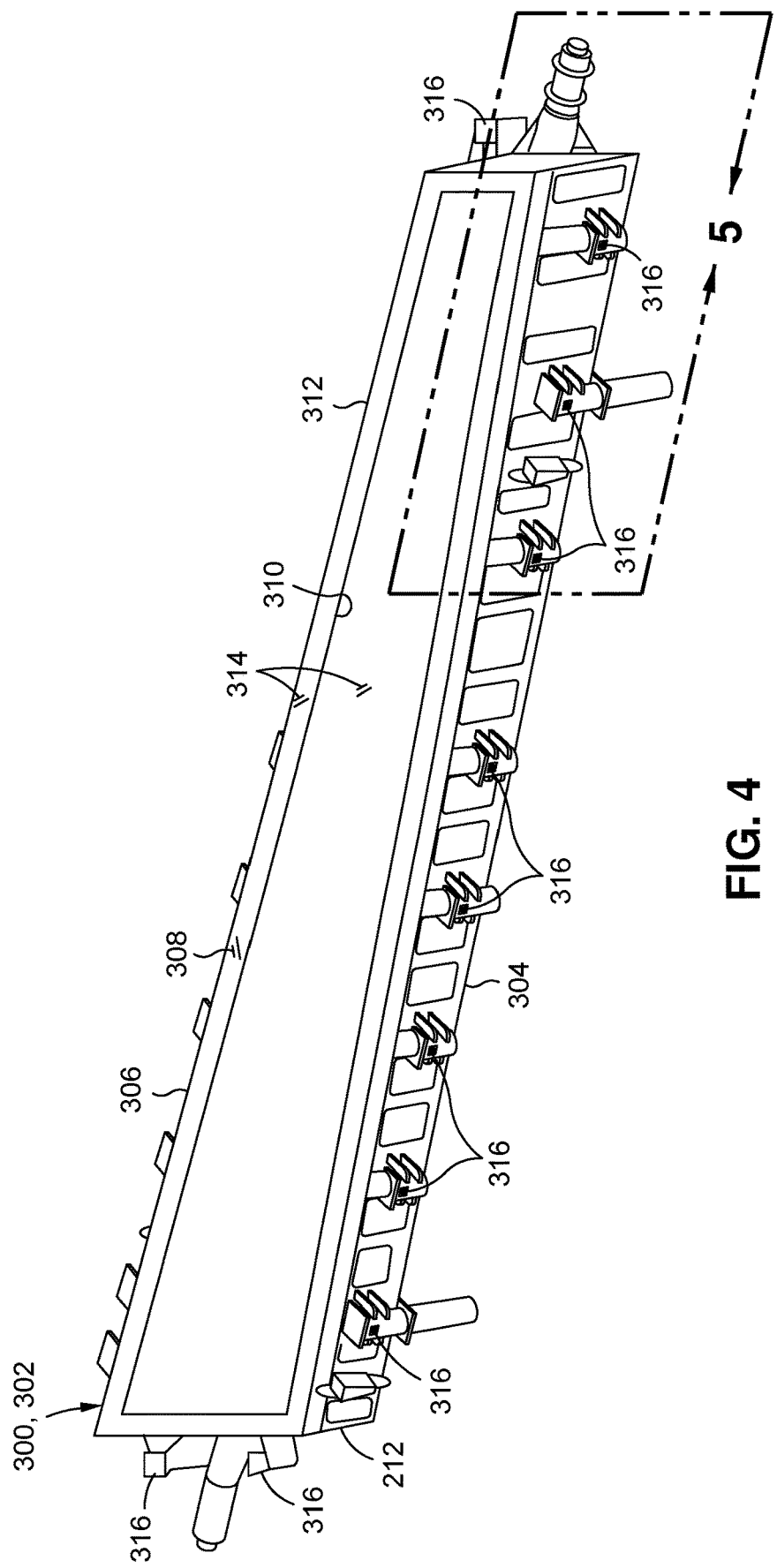
FIG. 4 is a perspective view of an example of the workpiece and illustrating an operating surface and a plurality of fiducial markers to which the robot registers prior to operating on the workpiece.

FIG. 4 shows the example of the workpiece 300 configured as a layup mandrel 302. The layup mandrel 302 includes a layup surface 314 (e.g., the operating surface) to be operated on by the end effector 110. In the present example, the operating surface 308 comprises a band of the layup surface 314 extending around a perimeter of the layup mandrel 302 and designated for autonomous cleaning by the robot 102. The workpiece 300 has a workpiece base 304 which may comprise legs for supporting the workpiece 300 on the floor surface 352. As indicated above, the workpiece 300 includes a plurality of fiducial markers 316 to which the robot 102 registers prior to operating on the workpiece 300. The fiducial markers 316 may be mounted on mandrel fixtures (not shown) protruding laterally outwardly from the workpiece 300 at spaced locations along the perimeter of the workpiece 300.

Referring to FIGS. 5-8, shown in FIG. 5 is a portion of the workpiece 300 illustrating three of the fiducial markers 316 mounted to the workpiece 300 to facilitate registration of the robot 102 to the workpiece 300. Each one of fiducial markers 316 has a unique identification pattern 318. For example, FIG. 6 shows a first fiducial marker 316a having a first identification pattern 318a. FIG. 7 shows a second fiducial marker 316b having a second identification pattern 318b different than the first identification pattern 318a. FIG. 8 shows a third fiducial marker 316c having a third identification pattern 318c different than the first identification pattern 318a and the second identification pattern 318b. Although the fiducial markers 316 are illustrated as having identification patterns 318 that are square-shaped and monochrome, the fiducial markers 316 may be provided in any one a variety of different sizes, shapes, colors, and configurations. When in the field of view of the sensor system 114 (FIGS. 9-10) of the robot 102 (FIGS. 9-10), the fiducial markers 316 may be imaged by the sensor system 114 (e.g., camera-based machine vision system) of the robot 102 and matched by the processor 204 (FIG. 2) to the corresponding fiducial markers 316 represented in the CAD model 208 (FIG. 2) of the workpiece 300 to allow the processor 204 to confirm the location of the robot 102 relative to the workpiece 300. In addition, the fiducial markers 316 facilitate a determination of the position (e.g., location and orientation) of the workpiece 300 relative to the robot 102 during the below-described process of iteratively adjusting the approximate workpiece position 244 within the world map 242 (e.g., FIG. 15) to the actual workpiece position 306 within the physical environment 350 (FIG. 3).

FIGS. 9-10 show an example of a robot 102 as may be implemented in the present disclosure. As mentioned above, the robot 102 has a mobile base 104 for self-propelled movement along a floor surface 352 (FIG. 3), and includes the robotic arm 106 supporting the end effector 110. In the example shown, the robot 102 includes a user interface 246 including a keyboard 250 and having a display screen 248 which, in the example shown, illustrates the CAD model 208 of the workpiece 300 and a computer representation 214 of the robot 102 within a world map 242 of the physical environment 350 containing the workpiece 300 and the robot 102. FIG. 10 is a further perspective view of the robot 102 showing an example of the sensor system 114 for navigation of the robot 102 and registration to the workpiece 300.

Figure 11:
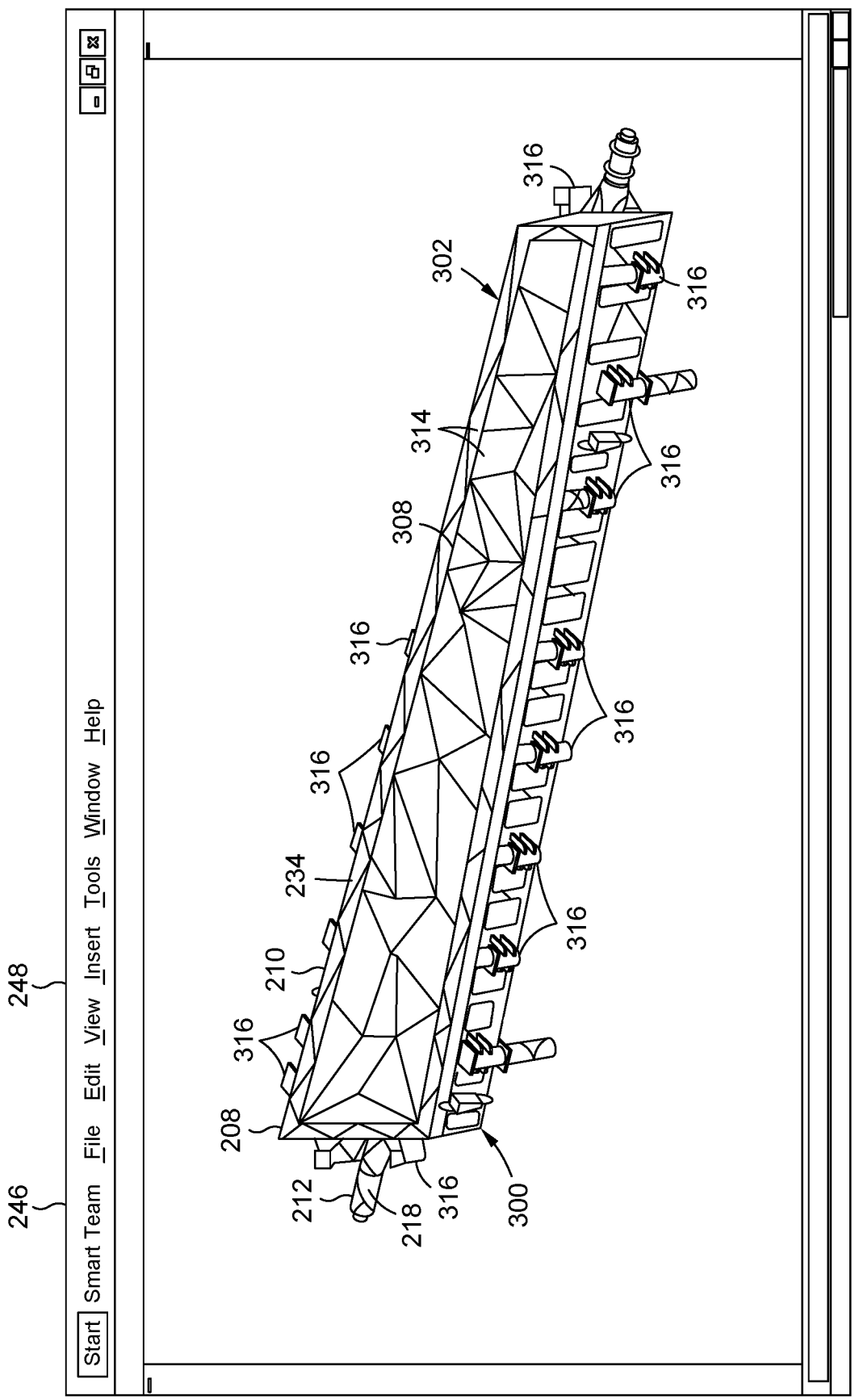
FIG. 11 is an illustration of a display screen showing a CAD model of the workpiece of FIG. 4 and from which a geometry file (e.g., a STEP file) is autonomously generated and containing a definition of the operating surface, the fiducial markers, and tessellated workpiece collision geometry of the workpiece.

FIG. 11 is an illustration of a display screen 248 of the robot 102 (FIGS. 9-10) or remote computing device 202 showing the CAD model 208 of the workpiece 300. The CAD model 208 may be a three-dimensional solid model of the workpiece 300, or the CAD model 208 may be a three-dimensional surface model of the workpiece 300. The CAD model 208 may be manually selected by a user from among a listing (not shown) of different workpieces 300. For example, the CAD model 208 may be selected from a drop-down menu (not shown) of CAD models using a touch-screen display screen to 48 or a keyboard 250 of the robot 102 or a remote computing device 202 (FIG. 2).

In the present disclosure, the processor 204 (FIG. 2) is configured to generate the above-mentioned geometry file 216 of the CAD model 208 from which the master plan 222 is generated. As described below, the geometry file 216 contains a definition of the operating surface 308 (FIG. 11) of the workpiece 300, the fiducial markers 316 (FIG. 11) of the workpiece 300, and tessellated workpiece collision geometry 218 (FIG. 11). In one example, the geometry file 216 may be saved in STEP (Standard for the Exchange of Product data) format. However, the geometry file 216 may be saved in formats other than STEP format.

In FIG. 11, the operating surface 308 may be defined by a user using a user interface 246 (FIGS. 9-10) to select the operating surface 308 from the CAD model 208. For example, the operating surface 308 may be manually selected from the CAD model 208 by a user manually selecting the boundaries of the operating surface 308. In the context of the layup mandrel 302 of FIG. 11, a user may manually select the inner perimeter 310 and the outer perimeter 312 that define the band of surface area extending around the perimeter of the layup surface 314. However, in other examples, the operating surface 308 may be pre-designated in the CAD model 208 by the CAD model 208 developer, and the processor 204 may autonomously select the pre-designated operating surface 308 from the CAD model 208 once the CAD model is manually selected by the user. Once selected, the definition of the operating surface 308 is saved to the geometry file 216. In the present disclosure, an autonomous operation may be described as an operation that is automatically performed without manual prompting or manual intervention.

The processor 204 may also save a definition of the plurality of fiducial markers 316 in the geometry file 216. As mentioned above, the fiducial markers 316 are included in the CAD model 208 of the workpiece 300. As mentioned above, the fiducial markers 316 may be mounted on the workpiece 300 at a location and spacing that is based at least in part on the reach distance (e.g., the reach radius) of the robotic arm 106 of the robot 102. The fiducial markers 316 may be located to be within the field of view of the sensor system 114 (e.g., a camera-based machine vision system) of the robot 102 when in proximity of the fiducial markers 316. Once the fiducial markers 316 have been defined, the processor 204 saves the definition of the fiducial markers 316 to the geometry file 216.

The processor 204 may also autonomously select and tessellate the collision geometry 212 of the CAD model 208 to form tessellated workpiece collision geometry 218 for use during collision checking with the robot 102. Collision geometry of the workpiece 300 may be described as the topology of the workpiece 300 that the robot 102 may potentially collide with when navigating around the workpiece 300 and when the robot 102 is operating on the operating surface 308 when stationed at any one of the working waypoints 228. The collision geometry 212 may be geometry of exterior-facing portions of the workpiece 300 that the robot 102 could potentially come into contact with. The collision geometry 212 exclude geometry on an interior side of the workpiece 300 such as on an underside of the operating surface 308. Tessellation of the collision geometry 212 by the processor 204 may be described as simplifying the three-dimensional image of the CAD model 208 into a plurality of interlocking planar polygonal shapes that are non-overlapping and non-gapped relative to one another. The tessellated workpiece collision geometry 218 may reduce the computational intensity of collision checking calculations.

As mentioned above, the geometry file 216 may be saved as a STEP file containing at least the definition of the operating surface 308, the fiducial markers 316, and the tessellated workpiece collision geometry 218 of the workpiece 300. However in other examples, the geometry file 216 may be saved in Initial Graphics Exchange Specification (IGES) format or in any other format that allows for defining and grouping of three-dimensional geometry, topology, and/or other configuration data of the CAD model 208 of the workpiece 300 that facilitates navigation of the robot 102 and operations performed by the end effector 110 on the workpiece 300.

Figure 12:
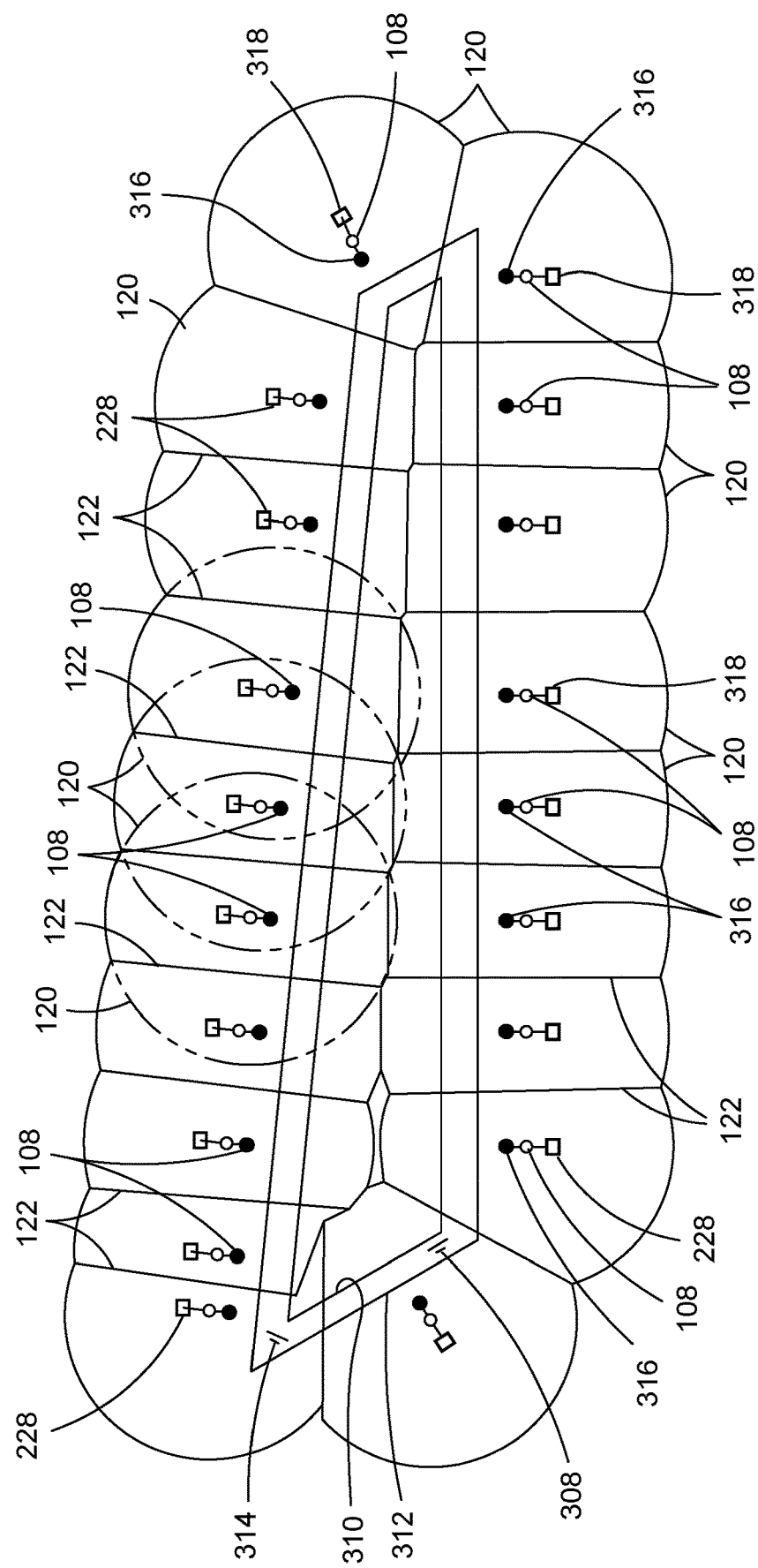
FIG. 12 is a plan view of the operating surface of the geometry file illustrating a plurality of reach spheres autonomously constructed at each one of the fiducial markers for dividing the operating surface into a plurality of surface segments to be individually operated upon by at least one robot.

FIG. 12 is an illustration of the definition of the operating surface 308 generated from the geometry file 216 in the manner described above. Superimposed on the operating surface 308 is a plurality of reach spheres 120 autonomously constructed by the processor 204 and corresponding to each one of the fiducial markers 316. The reach spheres are constructed as a means for dividing the operating surface 308 into a plurality of surface segments 232 to be individually operated upon by the robot 102 according to the above-mentioned master plan 222 autonomously generated by the processor 204.

In generating the master plan 222, the processor 204 is configured to autonomously construct, based on the geometry file 216, a plurality of working waypoints 228 at a predetermined distance respectively from the fiducial markers 316. The distance between each fiducial marker 316 and working waypoint 228 may be based on the reach distance of the robotic arm 106. For example, the processor 204 may autonomously construct a working waypoint 228 at a predetermined non-zero distance from each one of the fiducial markers 316. The predetermined distance may be based on the external dimensions of the mobile base 104, the reach distance of the robotic arm 106, and other robot 102 parameters such as the kinematic capability of the arm joints that make up the robotic arm 106, the size of the interfacing portion 112 of the end effector 110 such as the diameter of the buffer pad of the orbital buffer, and other factors. Each working waypoint 228 may be defined at a predetermined distance from a fiducial marker as measured perpendicularly from the face of a fiducial marker 316.

After defining the working waypoints 228, the processor 204 is configured to autonomously construct the above-mentioned reach sphere 120 at each working waypoint 228. A reach sphere 120 may be described as an infinitesimally thin shell. For a robotic system 100 using a single robot 102 to operate on a workpiece 300, the reach spheres 120 at each working waypoint 228 have the same sphere perimeter which may represent a maximum reach distance of the end effector 110 as measured from a center of rotation of a robotic arm base 108 (FIGS. 9-10). At the intersection of each reach sphere 120 with the operating surface 308, the processor 204 autonomously constructs a boundary line 122 extending between two intersections of each adjacent pair of sphere perimeters. Each adjacent pair of boundary lines 122 defines a surface segment 232. In this regard, each one of the surface segments 232 may be bounded at least in part by an opposing pair of boundary lines 122 and, depending upon the definition of the operating surface 308, may additionally be bound by an outer perimeter 312 (FIG. 11) and/or by an inner perimeter 310 (FIG. 11) of the operating surface 308 and/or by a portion of a reach sphere 120.

After defining the surface segments 232, the processor 204 may autonomously tessellate each one of the surface segments 232 to form a plurality of tessellated surface segments 234 (FIG. 11). In addition, at each one of the working waypoints 228, the processor 204 is configured to autonomously determine a cut direction 236 for the end effector 110. The cut direction 236 may be determined as being the direction of largest dimension of the surface segment 232. For example, the cut direction 236 may be the direction of the longest straight-line distance between opposing sides of the tessellated surface segment 232. The cut direction 236 generally defines the direction of movement of the end effector 110 when the operating surface 308 is viewed from a top-down direction. At each working waypoint 228, the processor 204 may autonomously construct a series of vertical planes (not shown) each oriented parallel to the cut direction 236 of the tessellated surface segment 232. The vertical planes may be spaced apart at a distance corresponding to the width of the interfacing portion 112 (FIGS. 9-10) of the end effector 110. As mentioned above, the interfacing portion 112 of the end effector 110 may be described as the portion of the end effector 110 that is in direct intimate contact with the operating surface 308, such as the portion of the buffing pad that cleans the layup surface 314.

At each working waypoint 228, the vertical planes are intersected with the tessellated surface segment 232 (FIG. 13) to thereby form a plurality of movement paths 238 along the surface segment 232. The movement paths 238 define the three-dimensional path of movement along which the end effector 110 moves when the robot 102 is stationed at the working waypoint 228. For each working waypoint 228, the processor 204 may designate alternating directions of movement of the end effector 110 along adjacent movement paths 238. The processor 204 autonomously saves the master plan 222 containing the movement paths 238 of the end effector 110 at all of the working waypoints 228, and the sequence of movements representing the direction and order of movement of the end effector 110 along the movement paths 238 at each working waypoint 228.

Figure 13:
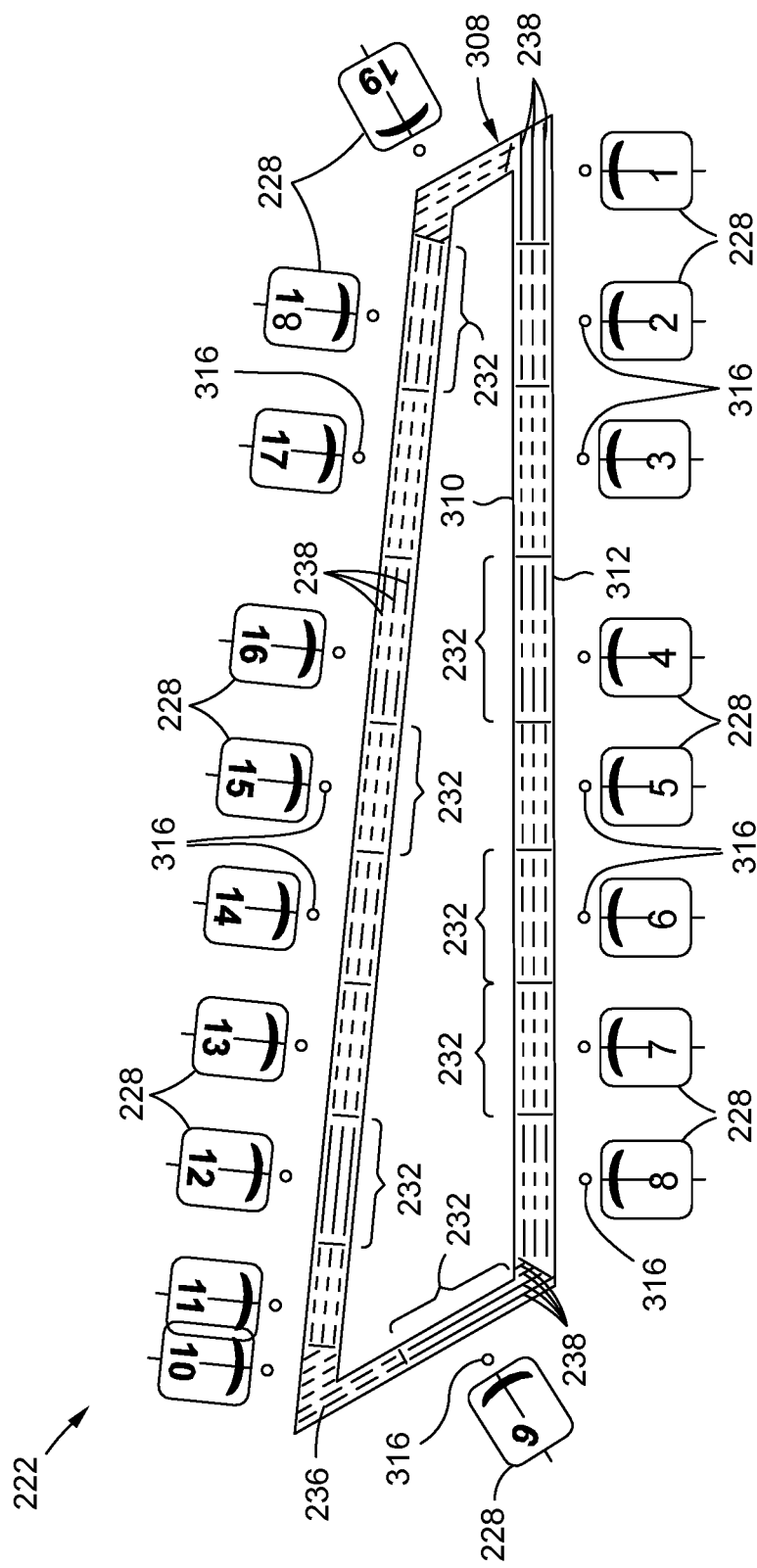
FIG. 13 is an illustration of an example of a master plan autonomously generated by the processor based on the geometry file and defining movement paths of the end effector based on a reach distance of the robotic arm.

FIG. 13 is an illustration of an example of a master plan 222 autonomously generated by the processor 204 (FIGS. 1-2) in the manner described above. As mentioned above, the master plan 222 contains the working waypoints 228, the movement paths 238 of the end effector 110 (FIGS. 9-10) at each working waypoint 228, and the sequence of movements of the end effector 110 along the movement paths 238 for each working waypoint 228. In FIG. 13, the working waypoints 228 are numbered consecutively to indicate an example of the order in which the robot 102 (FIGS. 9-10) may sequentially move from working waypoint 228 to working waypoint 228, stopping at each working waypoint 228 to allow the end effector 110 to operate on the portion of the surface segment 232 corresponding to the working waypoint 228.

Figure 14:
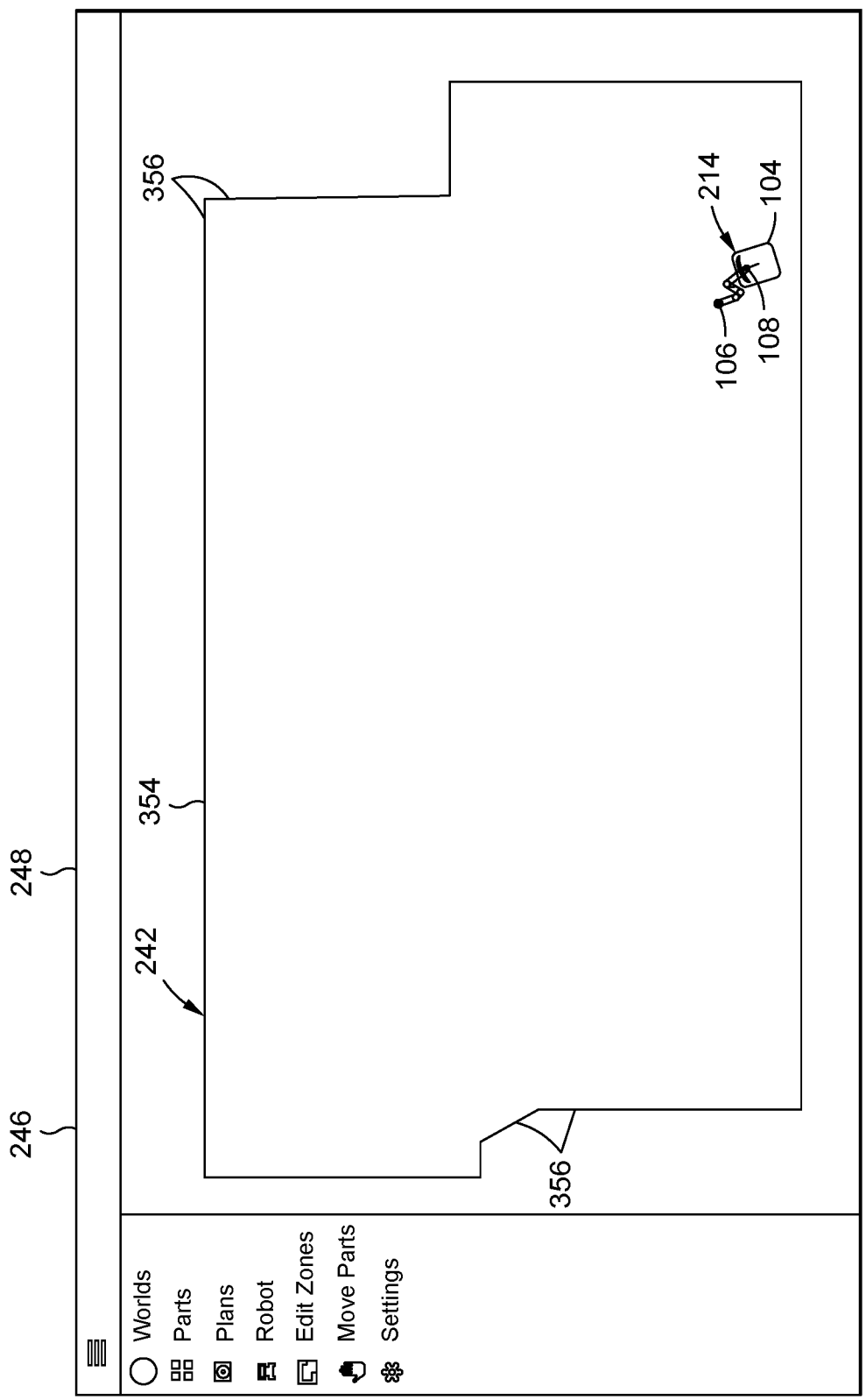
FIG. 14 is an illustration of a display screen of the robot and/or the remote computing device and illustrating a world map representing the physical environment containing the workpiece and containing a computer representation of the robot.

FIG. 14 is an illustration of a display screen 248 of the robot 102 and/or the remote computing device 202 and showing a world map 242. The world map 242 is a two-dimensional or three-dimensional representation of the physical environment 350 (FIG. 3) for containing the workpiece 300 (FIG. 3) upon which the robot 102 will operate. The physical environment 350 may include a dedicated room in which the robot 102 operates on the workpiece 300, or the physical environment 350 may include a localized area of a facility within which the robot 102 (FIGS. 9-10) operates on the workpiece 300. Also shown within the world map 242 of FIG. 14 is a computer representation 214 of the robot 102. In some examples of the robotic system 100, the world map 242 may have been previously constructed by the robot 102 and saved in the memory 206 (FIG. 2) of the data processing system 200. If the world map 242 has been previously constructed and saved in the memory 206, then a user may select the world map 242 for loading into the processor 204 using a user interface 246 (FIGS. 9-10), the world map 242 from among a list (e.g., a drop-down menu) of world maps.

In FIG. 14, if a world map 242 of the physical environment 350 does not exist in the memory 206, then the processor 204 may construct the world map 242 based on imaging data recorded by a robot 102 (FIGS. 9-10). The imaging data may represent the environment boundaries 354 of the physical environment 350 and may also represent objects (not shown) located within the environment boundaries 354. The imaging data may be recorded by the sensor system 114 while the robot 102 is piloted along the floor surface 352 of the physical environment 350 (FIG. 3). As mentioned above, the sensor system 114 of the robot 102 may include cameras 118 (FIG. 10), lasers 116 (FIG. 10), ultrasonic devices, and/or other imaging devices for three-dimensional mapping of the physical environment 350. For example, the robot 102 may include one or more laser scanners configured to perform simultaneous localization and mapping (SLAM) of the physical environment 350 while tracking the location of the robot 102 within the physical environment 350.

Referring still to FIG. 14, the mapping of the physical environment 350 may define the relative locations of structures such as walls 356, ceiling, barriers, fences, and doorways that form the environment boundary of the physical environment 350. In addition, the mapping of the physical environment 350 may define the relative locations of objects within the environment boundary such as posts, robot charging stations, manufacturing fixtures, utility fixtures such as lighting, plumbing, heating, ventilation, and other fixtures. Mapping of the physical environment 350 may be performed by remote-control piloting (e.g., via an operator manipulating a joystick) of the robot 102 around the physical environment 350 while the sensor system 114 maps the physical environment 350 and populates the world map 242. As part of the mapping operation, the processor 204 may position the computer representation 214 of the robot 102 within the world map 242 by particle filtering. After the world map 242 is constructed, the world map 242 and a computer representation 214 of the robot 102 may be saved to the memory 206 (FIG. 2) of the data processing system 200.

Figure 15:
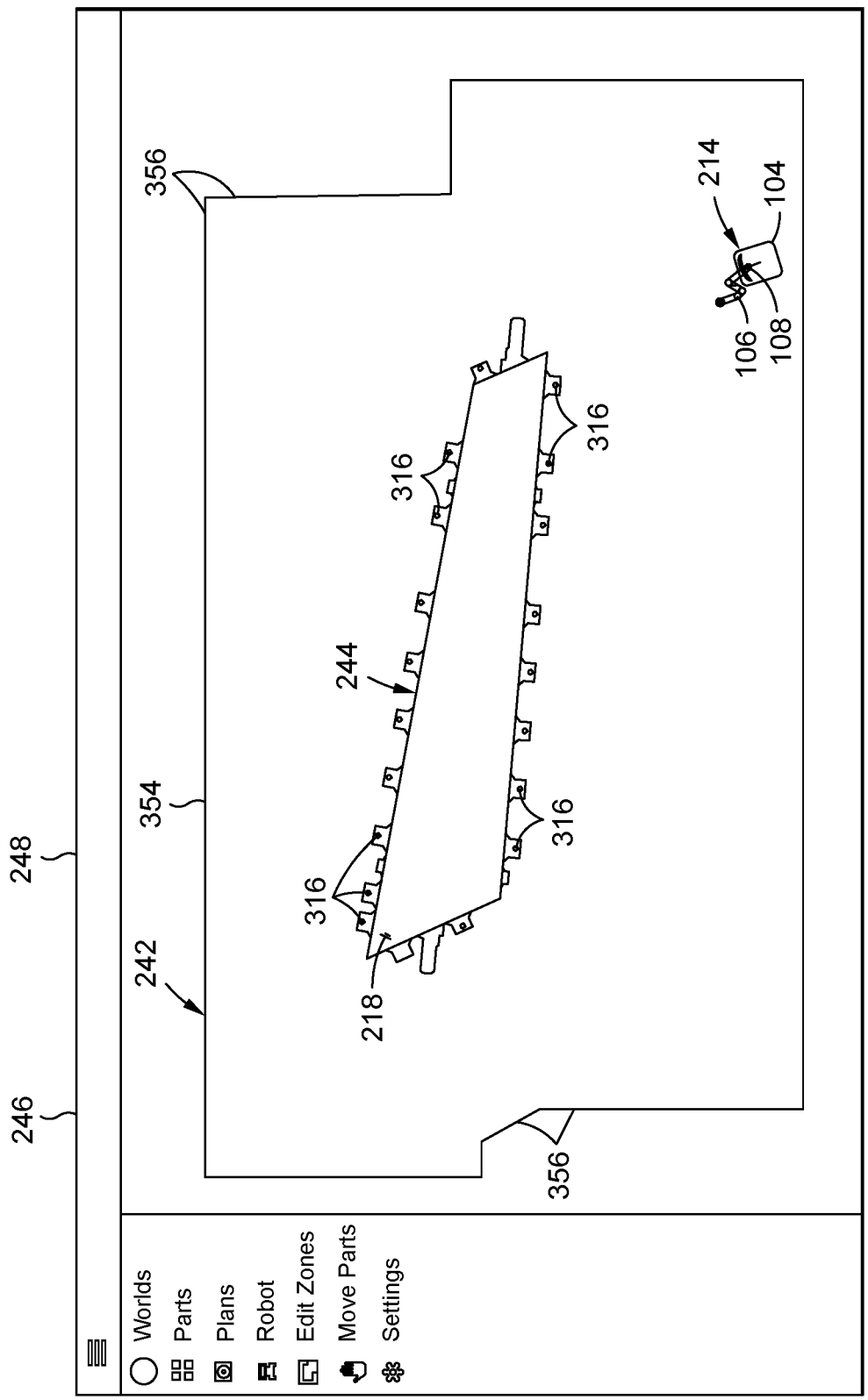
FIG. 15 is an illustration of the display screen of FIG. 14 showing the tessellated workpiece collision geometry and the computer representation of the robot positioned within the world map.

FIG. 15 is an illustration of the display screen 248 of FIG. 14 showing the tessellated workpiece collision geometry 218 of the workpiece 300 (FIG. 3) and a computer representation 214 of the robot 102 (FIGS. 9-10) positioned within the world map 242. If the world map 242 has previously been constructed and autonomously extracted from the geometry file 216 and loaded by the processor 204 into the world map 242 after being manually selected from a list (e.g., a drop-down menu), the processor 204 may autonomously adjust the position of the computer representation 214 of the robot 102 within the world map 242 by causing the robot 102 sensor system 114 (e.g., lasers 116) to scan the physical environment 350 and compare the scanned data to the world map 242 to determine the location and orientation of the computer representation 214 of the robot 102. However, for examples where the difference between the position of the computer representation 214 of the robot 102 within the world map 242 is large relative to the actual position of the robot 102 within the physical environment 350, then it may be necessary for a user to localize the position of the computer representation 214 of the robot 102 by manually manipulating or adjusting, via the user interface, the location and/orientation of the computer representation 214 of the robot 102 within the world map 242 to approximately match the actual location of the robot 102 within the physical environment 350.

Figure 16:
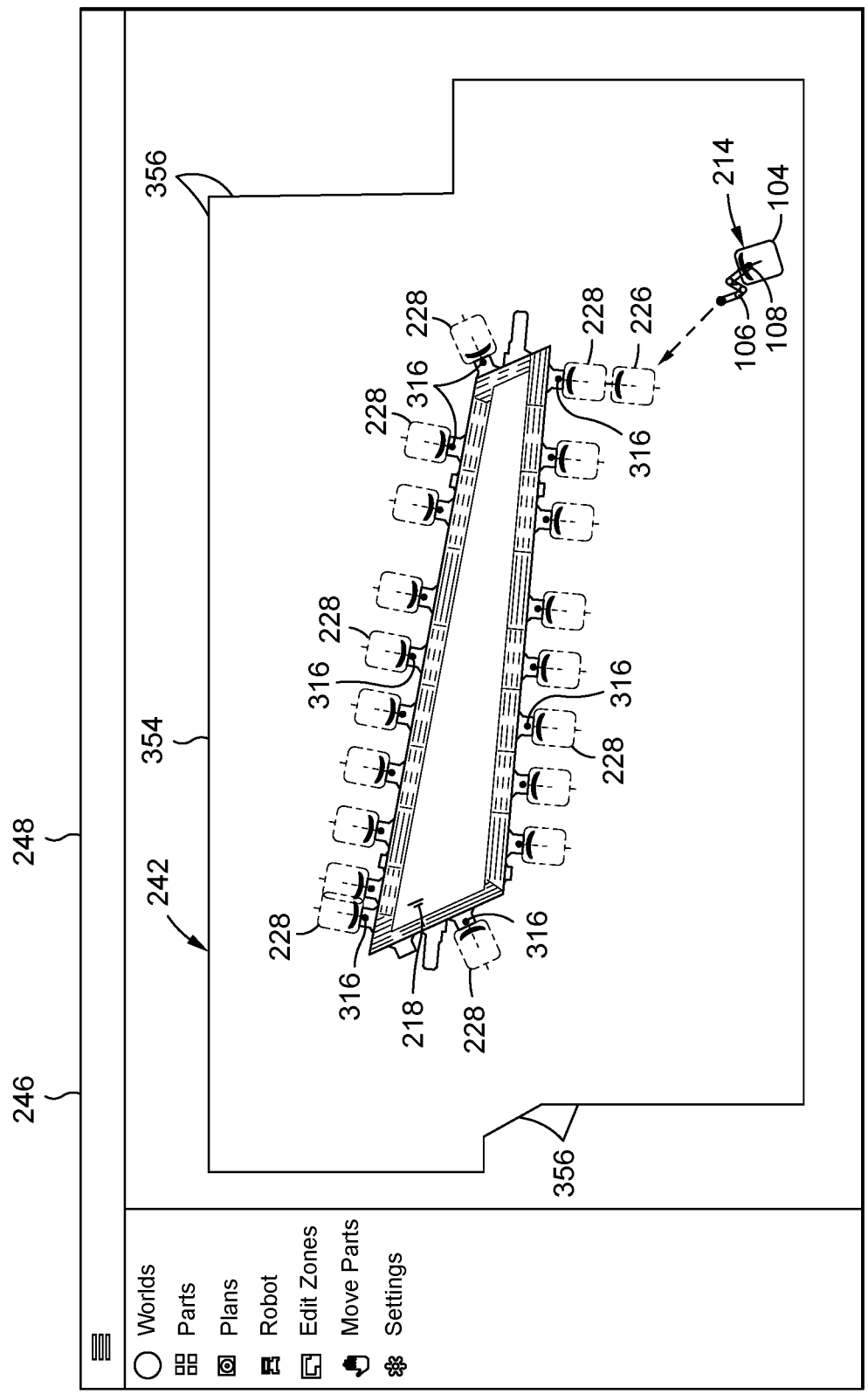
FIG. 16 is an illustration of the display screen of FIG. 15 further showing the master plan superimposed on the tessellated workpiece collision geometry prior to the robot autonomously driving to an approach waypoint in front of a working waypoint corresponding to one of the fiducial markers of the workpiece in the physical environment.

FIG. 16 is an illustration of the display screen 248 of FIG. 15 showing the master plan 222 superimposed on the tessellated workpiece collision geometry 218. The processor 204 may autonomously load the master plan 222 into the world map 242 once the tessellated workpiece collision geometry 218 has been loaded. The processor 204 may autonomously position the master plan 222 in the world map 242 in alignment with the tessellated workpiece collision geometry 218. For example, the master plan 222 may be positioned such that the working waypoints 228 in the master plan 222 are coincident with the location of the working waypoints 228 of the tessellated workpiece collision geometry 218. After loading the master plan 222, the processor 204 may autonomously create a convex hull 210 of the workpiece 300 based on the tessellated workpiece collision geometry 218, and may set the convex hull 210 as a keep-out region for the robot 102 during navigation of the robot 102 from working waypoint 228 to working waypoint 228. The convex hull 210 may be described as a top-down silhouette of the workpiece 300 reflecting the periphery of the workpiece 300 for collision checking between the robot 102 and the workpiece 300 during movements of the mobile base 104 and robotic arm 106. FIG. 16 also illustrates an approach waypoint 226 that the processor 204 has autonomously constructed in front of the working waypoint 228 to which the robot 102 may first navigate.

Figure 17:
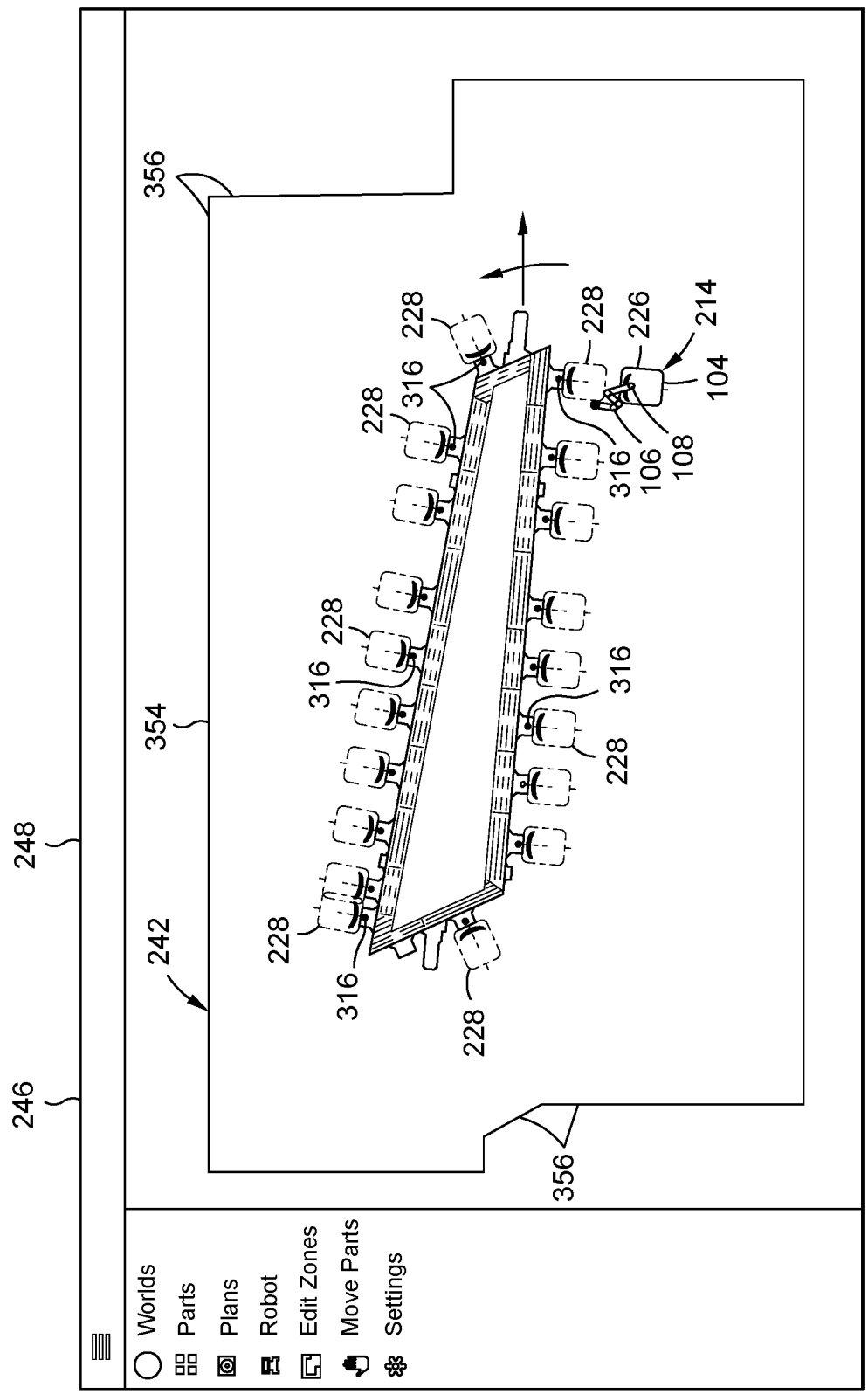
FIG. 17 is an illustration of the display screen of FIG. 16 showing the computer representation of the robot located at the approach waypoint of the tessellated workpiece collision geometry during autonomous registration of the robot to the workpiece in the physical environment and prior to adjustment of the approximate workpiece position of the tessellated workpiece collision in the world map.

FIG. 17 is an illustration of the display screen 248 of FIG. 16 showing the computer representation 214 of the robot 102 positioned at the above-mentioned approach waypoint 226 which corresponds to the first one of the working waypoints 228 at which the robot 102 autonomously registers to the workpiece 300. In some examples, the processor 204 may autonomously load a kinematic model 124 (FIG. 2) of the robot 102 into the world map 242, and may perform a reach check to determine, based on the kinematic model 124, whether the end effector 110 is capable of reaching all locations along the movement paths 238 defined in the master plan 222 for the robot 102 at each one of the working waypoints 228. The processor 204 may autonomously perform a reach check at least prior to the robot 102 registering to the workpiece 300. The kinematic model 124 of a robot 102 may be described as a definition of the size (e.g., length) of the individual arms (not shown) that make up the robotic arm and including the rotational capability of each arm joint (not shown). FIG. 17 also illustrates arrows adjacent the left-hand side of the master plan 222 denoting potential directions for adjustment of the position (e.g., location and/or orientation) of the tessellated workpiece collision geometry 218 in the world map 242 to match the actual workpiece position 306 (e.g., location and/or orientation) of the workpiece 300 in the physical environment 350.

Figure 18:
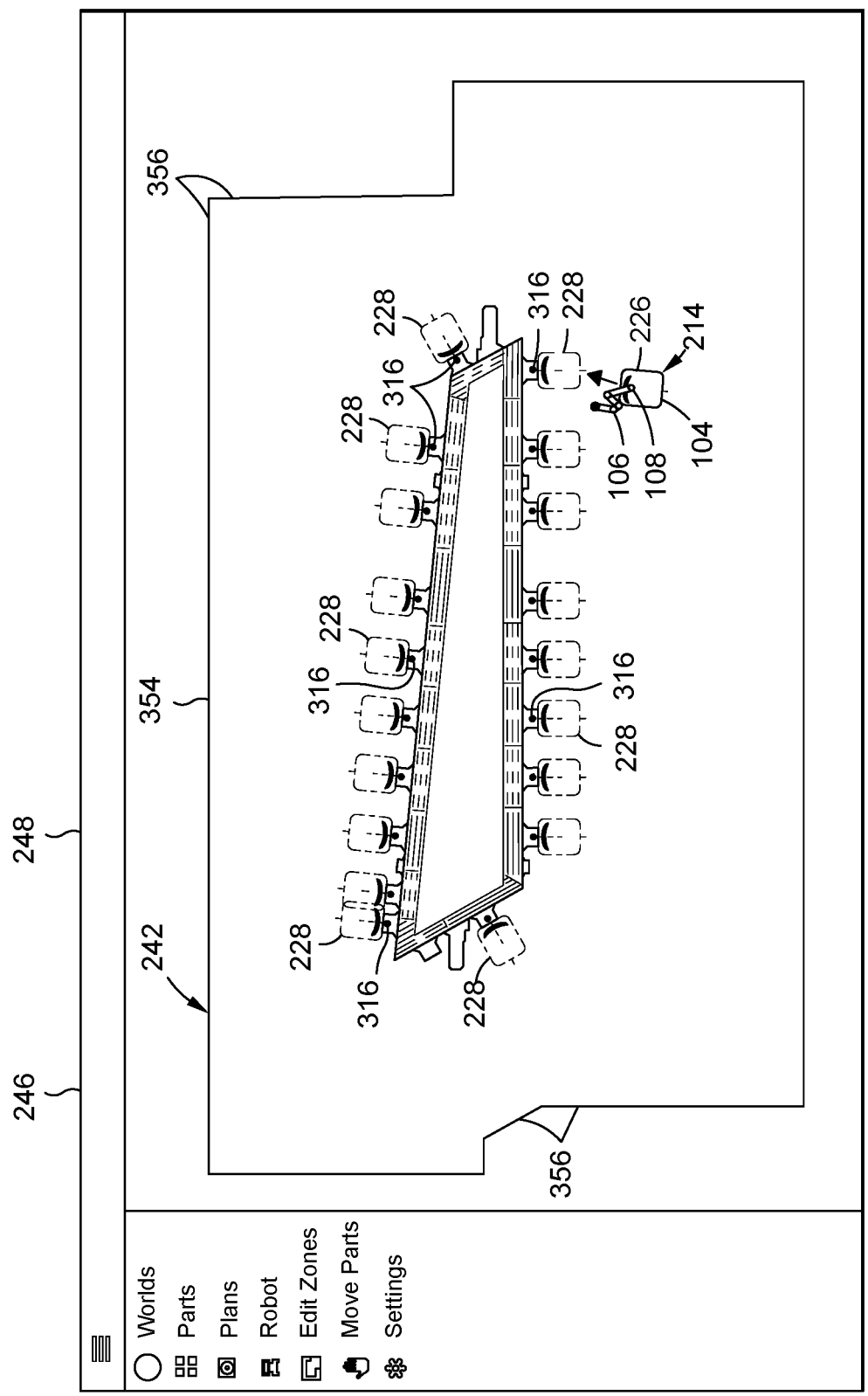
FIG. 18 is an illustration of the display screen of FIG. 17 showing the robot positioned at an approach waypoint in front of a fiducial marker of the workpiece after adjustment of the approximate workpiece position in the world map to match the actual workpiece position in the physical environment.

FIG. 18 shows the computer representation 214 of the robot 102 positioned at the approach waypoint 226 in front of a fiducial marker 316 after the approximate workpiece position 244 of the tessellated workpiece collision geometry 218 within the world map 242 has been adjusted to substantially match the actual workpiece position 306 of the workpiece 300 in the physical environment 350. The processor 204 autonomously performs the adjustment of the position of the tessellated workpiece collision geometry 218 by first navigating or driving the robot 102 from its current location in the physical environment 350 to an approach waypoint 226. As mentioned above, the processor 204 autonomously constructs an approach waypoint 226 in front of each one of the working waypoints 228. Each approach waypoint 226 is located at a predetermined safe distance in front of the working waypoint 228 at which the robot 102 can detect the fiducial marker 316 with relatively low risk of colliding with the workpiece 300. The distance between the approach waypoint 226 and working waypoint 228 may be based on the exterior dimensions of the robot 102 and the distance-measuring tolerance (e.g., several inches or centimeters) of the sensor system 114 which may use lasers 116 for navigation.

Figure 19:
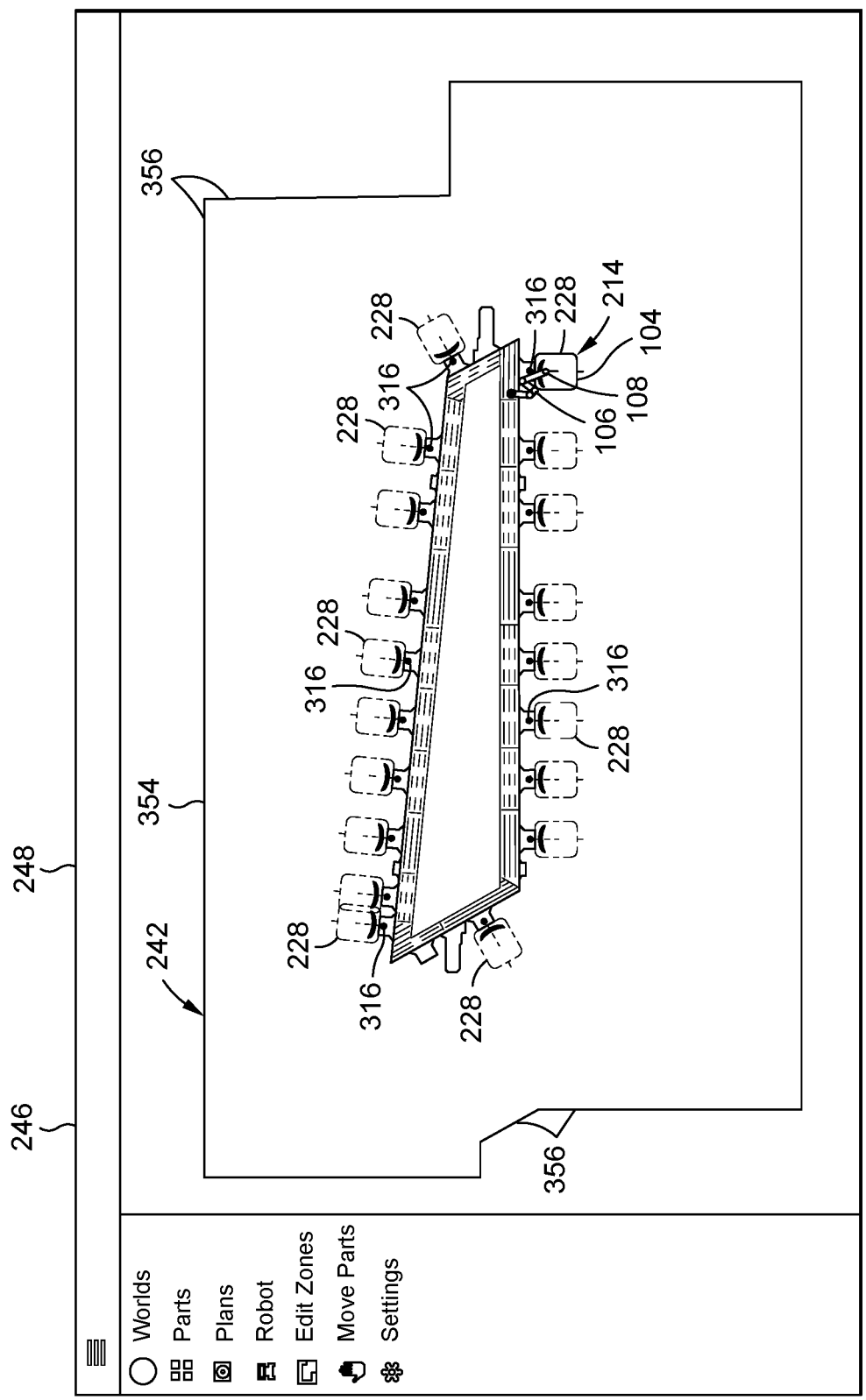
FIG. 19 is an illustration of the display screen of FIG. 18 showing the computer representation of the robot positioned at the working waypoint.

Referring to FIG. 17-19, once at the approach waypoint 226 as shown in FIG. 17, the robot 102 autonomously detects the fiducial marker 316 on the workpiece 300 such as by using one or more imaging systems. For example, the sensor system of the robot 102 may include cameras that have higher resolution than the laser-based navigation system of the robot 102. For example, the camera-based machine vision system of the robot 102 may image one or more of the fiducial markers 316 to determine the actual workpiece position 306 of the workpiece 300 within the physical environment 350. The processor 204 may receive images from the camera-based machine vision system and may confirm that the identification patterns 318 of the fiducial markers 316 currently being imaged match the identification pattern 318 of the fiducial markers 316 in the geometry file 216 of the workpiece 300. As mentioned above, the processor 204 may autonomously adjust the approximate workpiece position 244 of the tessellated workpiece collision geometry 218 within the world map 242 until the approximate workpiece position 244 (e.g., location and orientation) is within an initial tolerance of an actual workpiece position 306 (e.g., location and orientation) of the workpiece 300 in the physical environment 350. For example, the processor 204 may autonomously adjust the approximate workpiece position 244 within the world map 242 until within approximately 1 inch (e.g., 2.54 cm) of the actual workpiece position 306 within the physical environment 350. As shown in FIG. 17, the adjustment of the approximate workpiece position 244 may include both translation and orientation of the tessellated collision geometry 212 to match the actual workpiece position 306 within the physical environment 350.

After the approximate workpiece position 244 within the world map 242 has been adjusted to within the initial tolerance of the actual workpiece position 306 in the physical environment 350 as shown in FIG. 18, the robot 102 may autonomously drive from the approach waypoint 226 to the working waypoint 228 corresponding to the approach waypoint 226 as shown in FIG. 19. With the robot 102 at the working waypoint 228, the processor 204 may iteratively adjust the tessellated workpiece collision geometry 218 within the world map 242 until the world map 242 substantially matches the actual workpiece position 306 in the physical environment 350 within a predetermined final tolerance that is smaller than the initial tolerance. For example, the final tolerance may be on the order of 0.100 inch (2.54 mm) and, more preferably, less than approximately 0.050 inch (1.27 mm). In any one of the examples disclosed herein, the one or more robots 102 may continuously detect, identify, and match (e.g., with the geometry file 216) the fiducial markers 316 on the workpiece 300 as a background operation while driving toward and/or at any one of the approach waypoints 226 and/or working waypoints 228.

In addition, in any one of the examples disclosed herein, the one or more robots 102 may continuously (e.g., as a background operation) update or adjust the approximate workpiece position 244 within the world map 242 to within the initial or final tolerance of the actual workpiece position 306 in the physical environment 350 when a robots 102 is driving toward and/or is at any one of the approach waypoints 226 and/or working waypoints 228. Furthermore, in any one of the examples disclosed herein, the processor 204 may consider the quality of the detection of fiducial markers 316 by the sensor system 114 of a robot 102 in determining whether to continue to iteratively adjust the approximate workpiece position 244 within the world map 242. For example, when a robot 102 is driving from working waypoint 228 to working waypoint 228 and/or when the robot 102 is stationed at an approach waypoint 226, the processor 204 may use Kalman filtering to assess the quality of imaging data (e.g., of fiducial markers 316) generated by the sensor system 114 as a factor in determining whether or not to initially adjust or continue to adjust (e.g., during an iteration) the approximate workpiece position 244 within the world map 242. Alternatively or additionally, the processor 204 may be configured to assign a confidence value to each detection of a fiducial marker 316 by the robot 102 based on either the distance current between the robot 102 and a fiducial marker 316 or based on the location of the fiducial marker 316 in the images generated by the robot 102 sensor system 114. For example, a low confidence value may be assigned to imaging data in which the fiducial marker is located in the periphery of a lens (not shown) of the camera 118 due to a greater amount of distortion known to exists in the periphery of the lens relative to a reduced amount of distortion at or near the center of the lens. In contrast, a high confidence value may be assigned to imaging data in which the fiducial marker 316 is located in the center of the lens.

Figure 20:
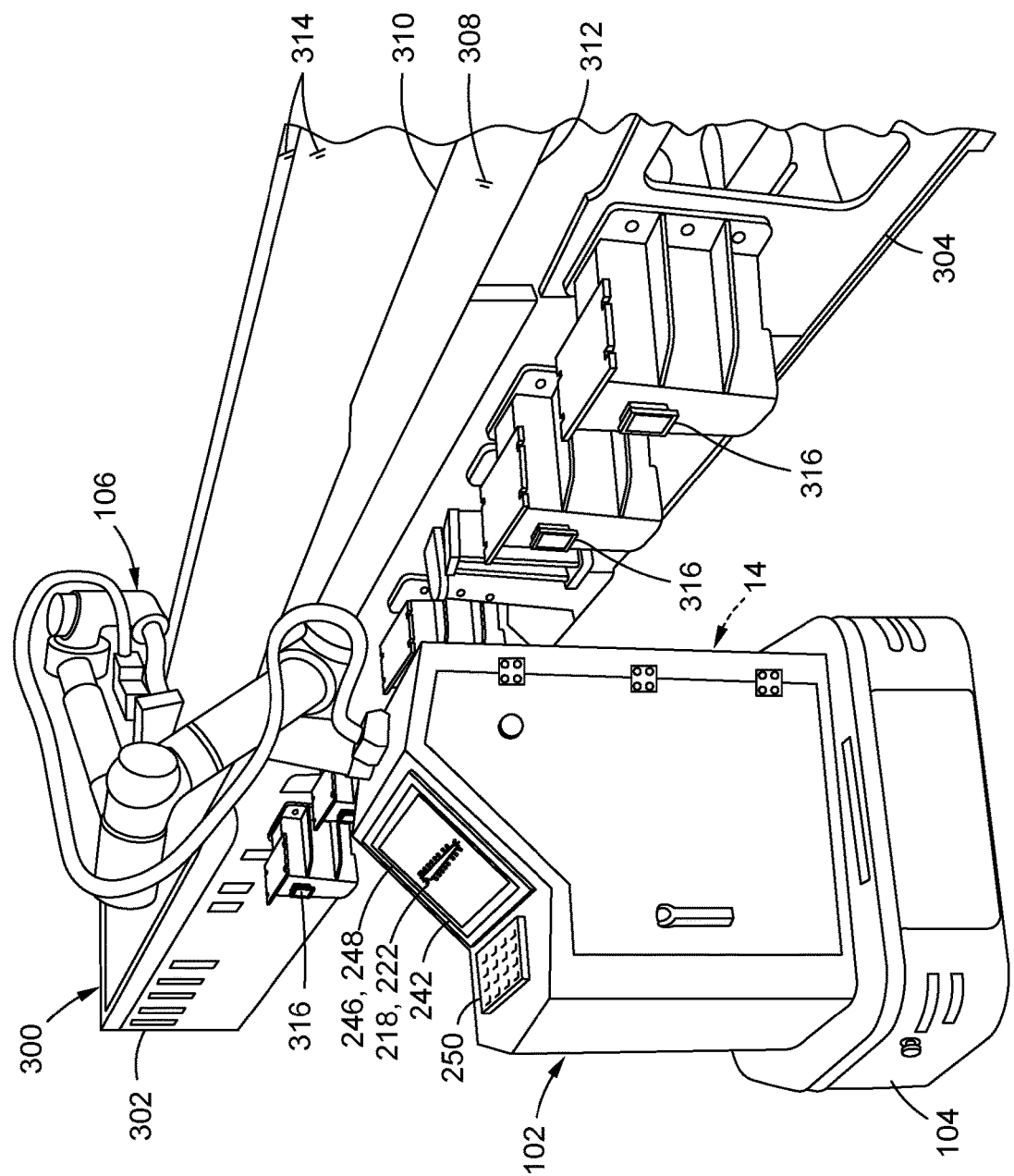
FIG. 20 is a perspective view of an example of the robot of FIGS. 9-10 positioned at the working waypoint prior to autonomously constructing a robotic arm trajectory for performing a sequence of movements of the end effector along the movement paths defined for the robot at the working waypoint.

FIG. 20 is a perspective view of an example of a robot 102 in a physical environment 350 and positioned at a working waypoint 228 of a workpiece 300 prior to the processor 204 (FIG. 1-2) autonomously constructing a robotic arm trajectory 240 (FIG. 2) for performing a sequence of movements of the end effector 110 along the movement paths 238 (FIG. 2) defined for the robot 102 at the working waypoint 228. In constructing the robotic arm trajectory 240 for the robot 102 at each working waypoint 228, the processor 204 is configured to sample a plurality of poses (not shown) of the end effector 110 at spaced intervals along each movement path 238 associated with the working waypoint 228 at which the robot 102 is currently located. A pose of the end effector 110 comprises a combination of the location and orientation of the end effector 110. The processor 204 samples a plurality of z-axis rotations (not shown) for each pose of the end effector 110, and solves all inverse kinematic solutions for each sampled pose. The processor 204 then constructs a graph (not shown) connecting all poses, and solves for minimum joint movement of the robotic arm 106 during movement of the end effector 110 between poses. The processor 204 constructs a robotic arm trajectory 240 for performing the sequence of movements of the end effector 110 along the movement paths 238 based on the minimum joint movement.

Figure 21:
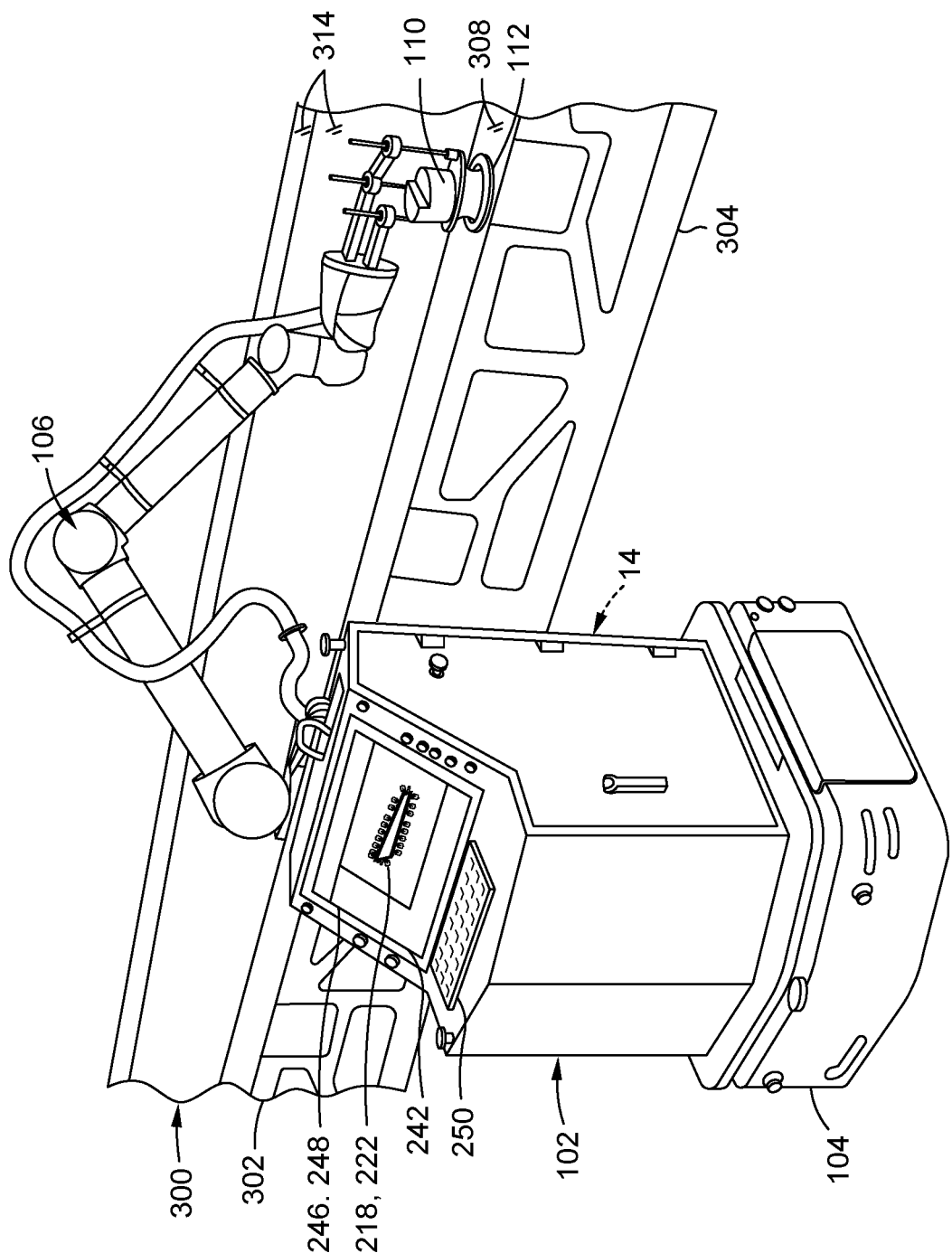
FIG. 21 is a perspective view of the robot of FIG. 20 autonomously executing the robotic arm trajectory on a portion of the operating surface corresponding to the portion of the master plan defined for the robot at the working waypoint.

FIG. 21 is a perspective view of the robot 102 of FIG. 20 autonomously executing a robotic arm trajectory 240 (FIG. 2) on the portion of the layup mandrel 302 (e.g., the operating surface 308) corresponding to the portion of the master plan 222 (FIG. 2) defined for the robot 102 at the working waypoint 228. In executing the robotic arm trajectory 240 in the context of the present disclosure, the robot 102 may clean the layup surface 314 using an orbital buffer as the end effector 110 follows the movement paths 238 defined in the master plan 222 (FIG. 13). The robot 102 successively drives to the working waypoints 228 defined in the master plan 222 and operates on each portion of the operating surface 308 that is defined for the end effector 110 at each working waypoint 228.

More particularly, for each one of the working waypoints 228, the robot 102 sequentially and autonomously performs the following steps: drives the robot 102 to the approach waypoint 226 in front of the working waypoint 228 and registers the robot 102 to the workpiece 300 (FIG. 17), adjusts the approximate workpiece position 244 in the world map 242 to within an initial tolerance (e.g., within 1.0 inch or 2.54 cm) of the actual workpiece position 306 in the physical environment 350 (FIGS. 17-18), drives the robot 102 from the approach waypoint 226 to the working waypoint 228 and adjusts the location and orientation of the computer representation of the robot 102 to match the location and orientation of the working waypoint 228 (FIGS. 18-19), iteratively adjusts the approximate workpiece position 244 within the world map 242 to within a final tolerance (e.g., within 0.050 inch or 1.27 mm) of the actual workpiece position 306 in the physical environment 350 (FIG. 19), constructs a robotic arm trajectory 240 for performing a sequence of movements of the end effector 110 along the movement paths 238 associated with the working waypoint 228 (FIG. 20), and executes the robotic arm trajectory 240 causing the end effector 110 to perform the sequence of movements along the movement paths 238 such that the end effector operates on the portion of the operating surface 308 defined for the working waypoint 228.

The robotic system 100 (e.g., the processor 204) is configured to autonomously perform the above-described steps at each one of the working waypoints 228 until the robot 102 has executed the master plan 222 to completion. The robot 102 is configured to autonomously navigate around the workpiece 300 and move from working waypoint 228 to working waypoint 228 without violating the convex hull 210 constructed for the workpiece 300 as described above. In some examples, the robotic system 100 may be configured to allow for manual pausing of the robot operations at any point. Such manual pausing may allow for manual entry of data such as allowing for a revised scan by the robot 102 of the physical environment 350 for updating the world map 242.

Figure 22:
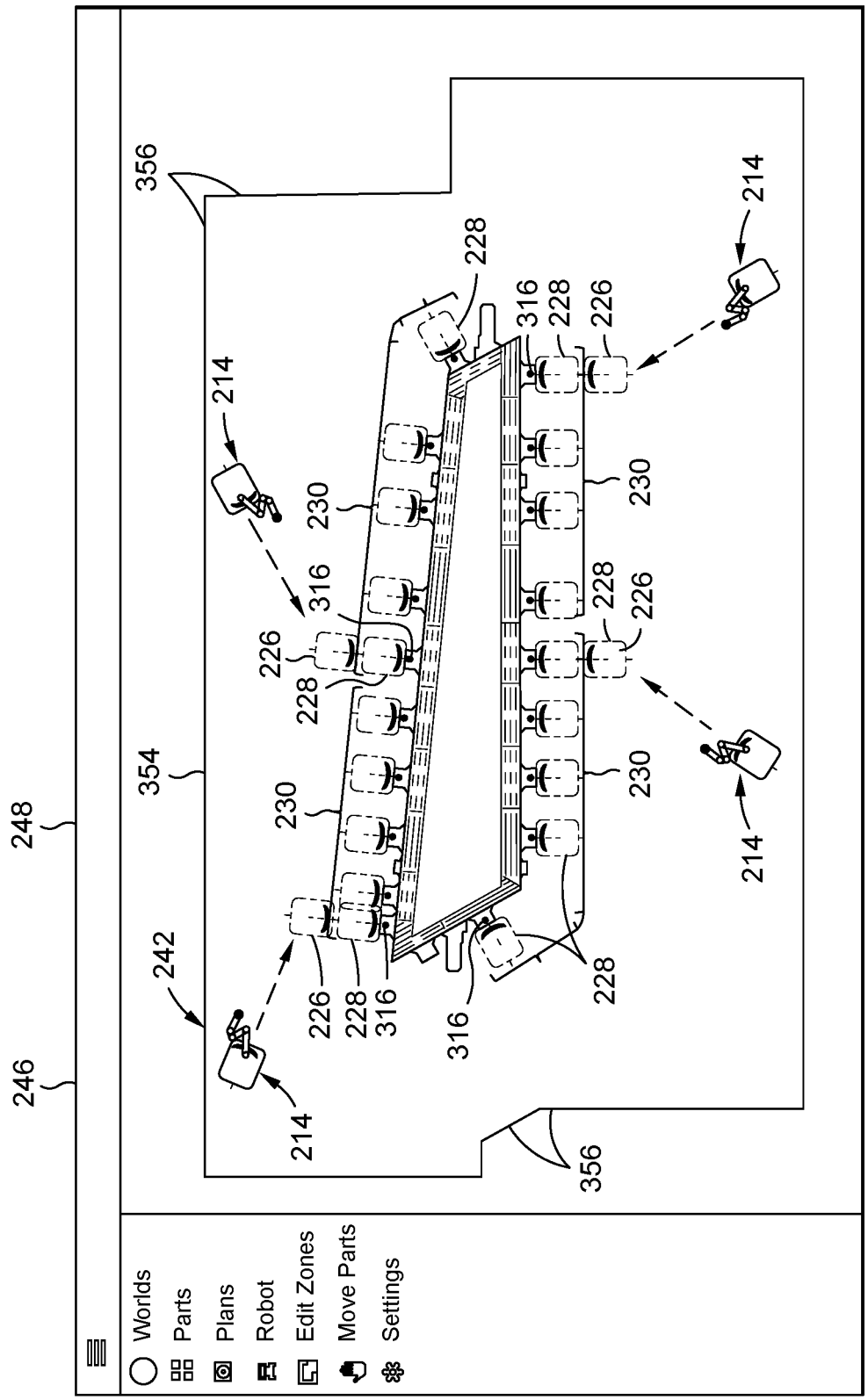
FIG. 22 is an illustration of a display screen showing a world map containing a plurality of robots for simultaneously operating on the workpiece.

Referring to FIG. 22, shown is a display screen 248 showing a world map 242 of a robotic system 100 containing a plurality of robots 102 for simultaneously and autonomously operating on a workpiece 300. The robotic system 100 with a plurality of robots 102 may operate in the same manner as described above the robotic system with a single robot 102, with the exception that in the robotic system having a plurality of robots 102, the master plan 222 includes a plurality of child plans 224 that are distributed to the corresponding plurality of robots 102. The master plan 222 may be generated by the processor 204 of one of the robots 102 or by the processor 204 of a remote computing device 202. The processor 204 may autonomously divide the master plan 222 into the plurality of child plans 224 for corresponding distribution to the plurality of robots 102. The child plans 224 may be wirelessly distributed by means of an antenna (not shown) that may be included with the robots 102 and/or the remote computing device 202. Each one of the child plans 224 defines movement paths 238 of the end effector 110 of the robot 102 to which the child plan 224 has been distributed. The movement paths 238 of each robot 102 may be based on the reach distance of the robotic arm 106 of the robot 102. Each one of the child plans 224 assigns to each robot 102 a unique set of working waypoints 230 from among the total quantity of working waypoints 228 defined in the master plan 222.

Referring still to FIG. 22, for a robotic system 100 having a plurality of robots 102, each robot 102 autonomously registers to the workpiece 300 in the above-described manner when the robot 102 is at an approach waypoint 226 in front of a working waypoint 228 of the set of working waypoints 230 assigned to the robot 102 by the child plan 224. However, only one of the robots 102, when driving toward and/or at the first one of the working waypoints 228 of its child plan 224, is used to adjust the tessellated workpiece collision geometry 218 within the world map 242 unless or until the approximate workpiece position 244 substantially matches the actual workpiece position 306 in the physical environment 350. The remaining robots 102 may not be used to change or adjust the approximate workpiece position 244 in the world map 242. Once the approximate workpiece position 244 in the world map 242 has been adjusted to match the actual workpiece position 306 in the physical environment 350, the robotic system 100 is configured such that the approximate workpiece position 244 is thereafter no longer adjusted each time the robots 102 move to another working waypoint 228 of their child plan 224. However, for each one of the robots 102 when at each working waypoint 228 in the set of working waypoints 230 assigned to the robot, the processor 204 is configured to autonomously construct a robotic arm trajectory 240 for performing a sequence of movements of the end effector 110 along the movement paths 238 associated with the working waypoint 228, and execute the robotic arm trajectory 240 in a manner causing the end effector 110 to operate on a portion of the operating surface 308 corresponding to the portion of the child plan 224 defined for the robot 102 at the working waypoint 228.

As mentioned above, the processor 204 autonomously generates the master plan 222 and divides the master plan 222 into the plurality of child plans 224 for corresponding distribution to the plurality of robots 102. In dividing the master plan 222 into the plurality of child plans 224, the processor 204 may assign a set of working waypoints 230 to each robot 102 based on one or more factors. For example, working waypoints 228 may be assigned to robots 102 based on waypoint location of the working waypoints 228 relative to one another. In this regard, working waypoints 228 may be clustered into groups based on their proximity to one another. For example, of the four robots 102 illustrated in FIG. 22, a first one of the robots 102 is assigned to working waypoints 228 identified as 1 through 4, a second one of the robots 102 is assigned to working waypoints 228 identified as 5 through 9, a third one of the robots 102 is assigned to working waypoints 228 identified as 10 through 14, and a fourth one of the robots 102 is assigned to working waypoints 228 identified as 15 through 19. Another factor in assigning working waypoints 228 to robots 102 may be based on end effector 110 capability of the end effectors 110 relative to one another. For example, one or more of the robots 102 may have end effectors 110 that are different than the end effectors 110 of other robots 102, and therefore may be better at performing operations on some areas of the operating surface 308 than other end effectors 110. In the example of cleaning a layup surface 314 of a layup mandrel 302, the buffing disc of one of the end effectors 110 may have a smaller diameter than the buffing disc of other end effectors 110, and therefore may be better able to access and clean high-curvature areas of the layup surface 314. Another factor in assigning working waypoints 228 to robots 102 may be based on robot workload relative to one another. For example, working waypoints 228 may be assigned in an attempt to balance the workload between robots 102 in terms of the total amount of time that each robot 102 operates on the operating surface 308.

In constructing a world map 242 for a robotic system 100 having a plurality of robots 102, a processor 204 may construct the world map 242 based on imaging data recorded by the sensor system 114 of one or more of the plurality of robots 102 while being piloted along the floor surface 352 of the physical environment 350. If necessary, the processor 204 may localize (e.g., via particle filtering) a computer representation 214 of each one of the plurality of robots 102 within the world map 242. As mentioned above, the position of the computer representation 214 of one or more of robots 102 may be manually manipulated by a user via a user interface 246 of one or more of the robots 102 or the remote computing device 202. In addition, the processor 204 may perform a reach check for each one of the robots 102 for each working waypoint 228 in the set of working waypoints 230 assigned to the role that by the child plan 224. For example, the processor 204 may load a kinematic model 124 of each unique one of the plurality of robots 102 for determining whether the end effector 110 of each robot 102 is capable of reaching all locations along the movement paths 238 associated with each one of the working waypoints 228 to which the robot 102 is assigned. The processor 204 may construct and execute the robotic arm trajectory 240 for each one of the plurality of robots 102 in the manner described above.

In any examples of the robotic system 100 disclosed herein, the robots 102 (FIGS. 9-10) and/or robotic arms 106 (FIGS. 9-10) may be collaborative robots, in the sense that the robots 102 are capable of operating in the same general workspace as humans or other moving objects. In this regard, the processor 204 of the robotic system 100 may be configured to autonomously stop movement of a robotic arm 106 and/or an end effector 110 upon the occurrence of an arm stopping condition. In the present disclosure, an arm stopping condition may be described as the occurrence of contact of a robotic arm 106 and/or end effector 110 with an object other than the operating surface 308 of the workpiece 300. For example, contact of the robotic arm 106 and/or end effector 110 with a stationary object (e.g., any surface other the than the operating surface 308 of the workpiece 300) or a movable object (e.g., another robot, a human, etc.) may cause the robot 102 to autonomously stop all movement. In another example, the movement of the mobile base 104 along the floor surface 352 may be autonomously stop upon the occurrence of a base stopping condition. In the present disclosure, a base stopping condition may occur upon the detection of any object that is on a collision course with the mobile base 104 and is within a certain distance of the robot 102. A base stopping condition may be determined by the processor 204 based on imaging data or other sensor input from the robot 102. Upon determining the existence of a base stopping condition, the processor 204 may be stop movement of the mobile base 104 prior to eminent collision of the robot 102 with the object.

Eminent collision may be described as a collision calculated by the processor 204 to occur within several seconds of detection of the object, or collision may be described as eminent when a moving object comes within several feet of the robot 102. Protection against collision detection may be provided by continuously monitoring objects that are within the field of view of the sensor system 114 (e.g., lasers 116, cameras 118, other sensors) of the robot 102. The robot 102 may include ultrasonic sensors for detecting objects located above the height of the robot 102. Distances between the robot 102 and an object may be mapped against the speed of the robot 102 to ensure that the robot 102 is capable of stopping prior to colliding with the object. Alternatively or additionally, protection against collision may be provided by monitoring motor encoders in the robot 102 continuously determine the speed of the robot, the difference in speed relative to the object, and the direction of motion of the robot 102 relative to object. A further safeguard against collision may include an interlock between the robotic arm 106 and the mobile base 104 to prevent simultaneous operation of the robotic arm 106 and mobile base 104.

Advantageously, in any one of the examples of the presently-disclosed robotic system 100, the processor 204 dynamically plans around all moving objects within the physical environment 350 whether such objects are detected by lasers 116, by cameras 118, or by other types of sensors such as ultrasonic sensors (not shown). If a human walks in front of the mobile base 104 of a robot 102, the processor 204 May autonomously plan around the human during navigation of the robot 102 such as when moving from working waypoint 228 to working waypoint 228. Additionally, if movement of the robotic arm 106 or mobile base 104 is stopped respectively due to the occurrence of an arm stopping condition or a base stopping condition as described above, the processor 204 May autonomously restart operation of the robot 102 at the state during which the movement was stopped or, if more appropriate, the robot 102 will autonomously progress to another more appropriate state where the robot 102 may recover and continue operation. If the robot 102 is bumped and slightly moved to a new position such as due to contact with a human while the robot 102 is stationed at a working waypoint 228, movement of the robotic arm 106 may stop and the processor 204 may autonomously construct a new robotic arm trajectory 240 at the new position of the robot 102.

Figure 23:
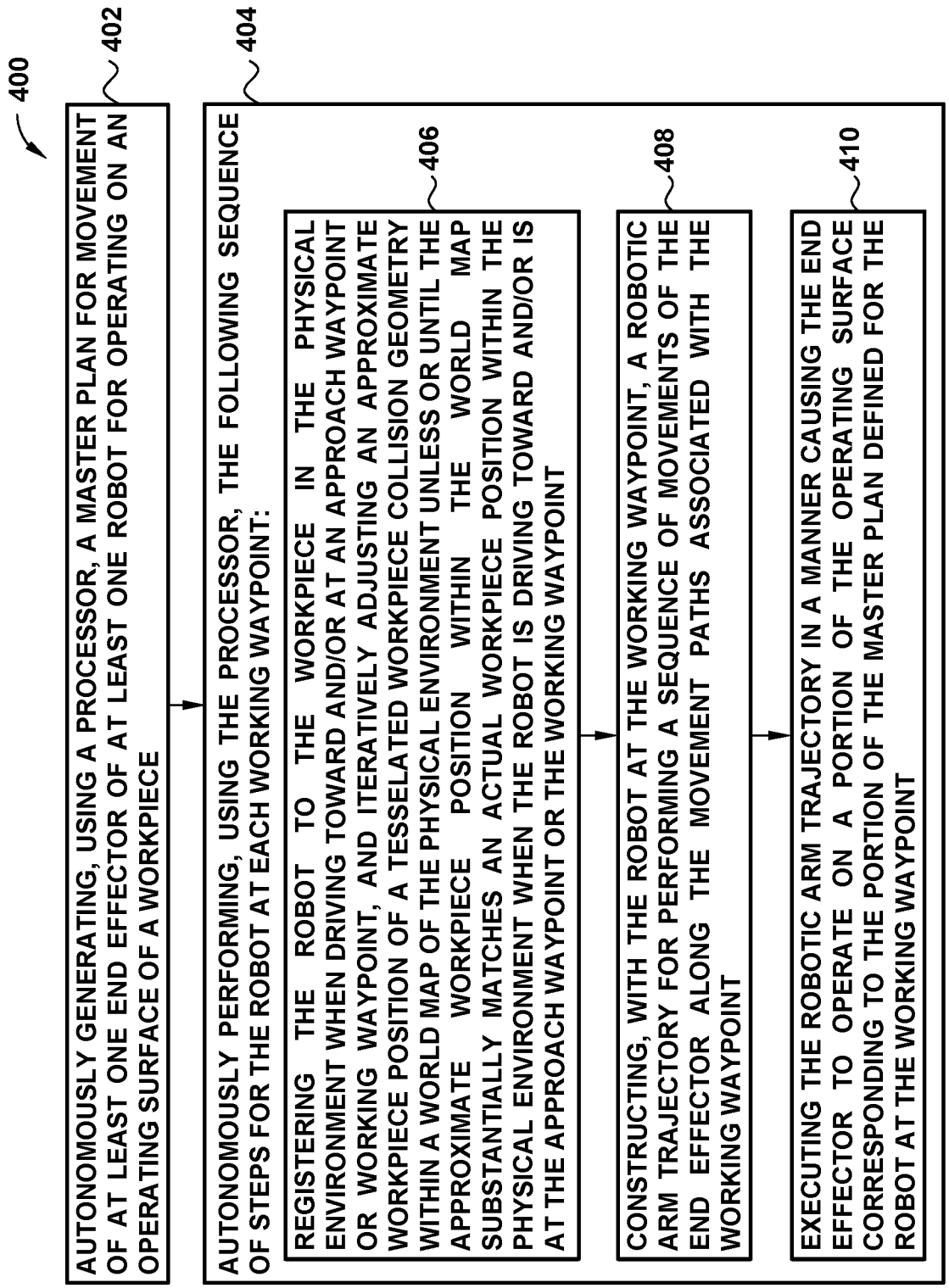
FIG. 23 is a flowchart of operations included in a method of autonomously operating on a workpiece.

FIG. 23 is a flowchart of operations included in a method 400 of autonomously operating on a workpiece 300. Step 402 of the method 400 includes autonomously generating, using a processor 204 a master plan 222 for movement of an end effector 110 of at least one robot 102 for operating on an operating surface 308 of a workpiece 300 (e.g., a layup mandrel 302) in a physical environment 350 such as a production facility or a composites part layup facility. As mentioned above, the master plan 222 is based on a CAD model 208 of the workpiece 300 and defines the movement paths 238 and the sequence of movements of the end effector 110 based at least in part on the reach distance of the robotic arm 106 of the robot 102 when the robot 102 is stationed at each of a plurality of working waypoints 228 included in the master plan 222. As mentioned above, the working waypoints 228 in the master plan 222 correspond to a plurality of fiducial markers 316 mounted on the workpiece 300 and which are represented in the CAD model 208.

Step 404 of the method 400 includes autonomously performing, using the processor 204, a sequence of steps for the robot 102 for each one of the working waypoints 228 in the master plan 222. Step 406 in the sequence includes autonomously registering the robot 102 to the workpiece 300 in the physical environment 350 when the robot 102 is at an approach waypoint 226 in front of a working waypoint 228, and iteratively adjusting a position (e.g., the location and orientation) of the tessellated workpiece collision geometry 218 within the world map 242 of the physical environment 350 unless or until an approximate workpiece position 244 (e.g., the location and orientation) of the tessellated workpiece collision geometry 218 within the world map 242 substantially matches the actual workpiece position 306 (e.g., the location and orientation) of the workpiece 300 in the physical environment 350. In some examples, the adjustment of the position of the tessellated workpiece collision geometry 218 may only be performed when the robot 102 is at the first one of the working waypoints 228. Unless the workpiece 300 in the physical environment 350 is moved after the initial adjustment of the tessellated workpiece collision geometry 218, it may not be necessary to further adjust the position of the tessellated workpiece collision geometry 218 in the world map 242 as the robot 102 moves from working waypoint 228 to working waypoint 228.

Step 408 in the sequence includes autonomously constructing, with the robot 102 at the working waypoint 228, a robotic arm trajectory 240 for performing a sequence of movements of the end effector 110 along the movement paths 238 associated with the working waypoint 228, as described in greater detail below with reference to FIG. 26. Step 410 in the sequence includes autonomously executing the robotic arm trajectory 240 in a manner causing the end effector 110 to operate on a portion of the operating surface 308 corresponding to the portion of the master plan 222 defined for the robot 102 at the working waypoint 228. As mentioned above, the robot 102 successively drives to each one of the working waypoints 228, and at each working waypoint 228, the processor 204 constructs a robotic arm trajectory 240 and causes the robotic arm 106 to execute the robotic arm trajectory 240 for the portion of the master plan 222 corresponding to the working waypoint 228.

Figure 24:
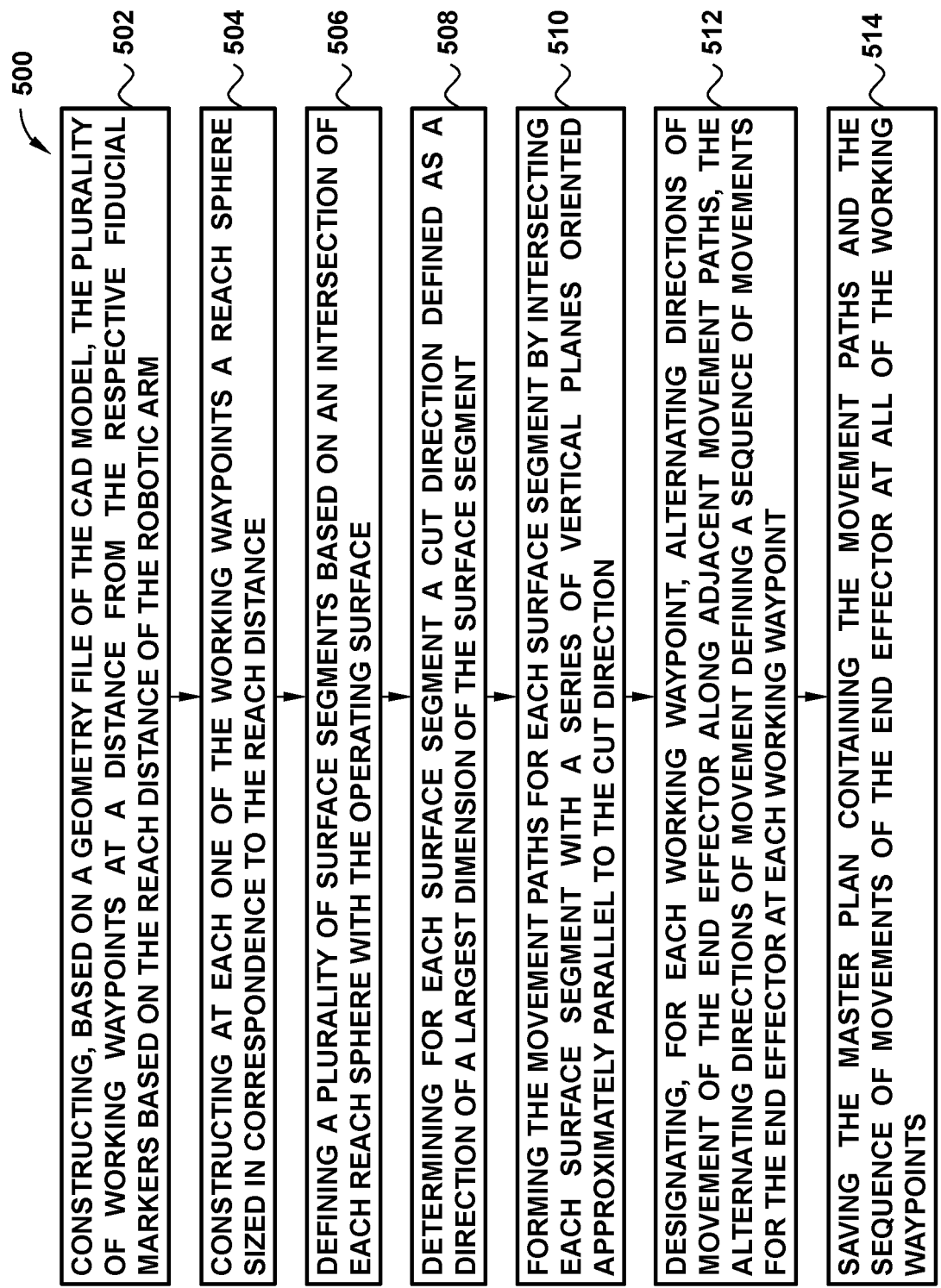
FIG. 24 is a flowchart of operations for autonomously generating a master plan.

FIG. 24 is a flowchart of operations included in a method 500 of autonomously generating the master plan 222 mentioned in step 402. Step 502 of the method 500 of autonomously generating the master plan 222 includes constructing, based on a geometry file 216 (e.g., a STEP file) of the CAD model 208, a plurality of working waypoints 228 respectively at a distance from the fiducial markers 316 based on the reach distance of the robotic arm 106. As mentioned above, a working waypoint 228 may be established at a predetermined non-zero distance from each one of the fiducial markers 316 based on the dimensions of the mobile base 104, the reach distance of the robotic arm 106, and/or based on other robot parameters. The process of generating the geometry file 216 further includes defining the operating surface 308 of the CAD model 208 of the workpiece 300 such as by selecting boundaries of the operating surface 308. Alternatively, the operating surface 308 may be pre-designated by the developer of the CAD model 208. In addition, the process of generating the geometry file 216 includes defining the plurality of fiducial markers 316 of the CAD model 208, and tessellating the collision geometry 212 of the CAD model 208 to form tessellated workpiece collision geometry 218, as described above. The geometry file 216 may be saved to include the definition of the operating surface 308, the fiducial markers 316, and the tessellated workpiece collision geometry 218 of the workpiece 300, and stored in the memory 206. As mentioned above, the geometry file 216 may be saved as a STEP file.

Referring still to FIG. 24 with additional reference to FIG. 12, step 504 of generating the master plan 222 may include constructing at each one of the working waypoints 228 a reach sphere 120 sized in correspondence to the reach distance of the robotic arm 106, as shown in FIG. 12. In the present disclosure, a reach sphere 120 may be described as an infinitesimally thin shell having a sphere diameter that corresponds to the reach distance of the robotic arm 106.

Step 506 of generating the master plan 222 may include defining a plurality of surface segments 232 based on an intersection of each reach sphere 120 with the operating surface 308. For example, as indicated above, the sphere perimeter of each one of the reach spheres 120 may be intersected with the operating surface 308, and a boundary line 122 may be constructed between the intersections of each adjacent pair of intersecting sphere perimeters. The boundary lines 122 may at least partially define the boundary of the surface segments 232. The generation of the master plan 222 may additionally include tessellating each one of the surface segments 232 to form a plurality of tessellated surface segments 234.

Step 508 of generating the master plan 222 may further include determining for each surface segment 232 a cut direction 236 which may be described as the direction of largest dimension of the surface segment 232. For example, the cut direction 236 may be the longest straight-line distance between opposing sides of a tessellated surface segment 232 when the operating surface 308 is viewed from a top-down direction. As mentioned above, the cut direction 236 may be approximately parallel to an outer perimeter 312 and/or inner perimeter 310 of the operating surface 308, as shown in FIG. 12. Step 510 of generating the master plan 222 includes forming the movement paths 238 for each surface segment 232 by intersecting each surface segment 232 with a spaced-apart series of vertical planes (not shown) that are each oriented approximately parallel to the cut direction 236. The intersection of the vertical planes at each working waypoint 228 with the surface segment 232 results in a plurality of movement paths 238 that are three-dimensional. As mentioned above, the movement paths are the paths along which the end effector 110 moves when operating on the operating surface 308. Step 512 of generating the master plan 222 may include designating, for each working waypoint 228, alternating directions of movement of the end effector 110 along adjacent movement paths 238. The alternating directions of movement define the sequence of movements of the end effector 110 at each working waypoint 228. Step 514 of generating the master plan 222 includes saving the master plan 222 containing the movement paths 238 and the sequence of movements of the end effector 110 at all of the working waypoints 228.

As mentioned above, step 406 includes iteratively adjusting the position of the tessellated workpiece collision geometry 218 within the world map 242. If the world map 242 has not yet been constructed and/or does not exist in the memory 206, the method may further include constructing the world map 242 by piloting (e.g., via remote control) the robot 102 along the floor surface 352 of the physical environment 350 while recording, using the sensor system 114 (e.g., camera 118, lasers 116, etc.) of the robot 102, imaging data of the environment boundaries 354 that define the physical environment 350 and objects within the environment boundaries 354. The method includes constructing, using the processor 204, the world map 242 based on the imaging data. The construction of the world map 242 may further include positioning or localizing, via particle filtering, the computer representation 214 of the robot 102 within the world map 242 to reflect the actual position of the robot 102 within the physical environment 350.

If the world map 242 exists, the processor 204 may autonomously load and position the tessellated workpiece collision geometry 218 of the workpiece 300 into the world map 242. In addition, the processor 204 autonomously loads into the world map 242 the master plan 222 in a manner such that the master plan 222 is aligned with the tessellated workpiece collision geometry 218 as shown in FIG. 16. In some examples, to reduce computational intensity during collision checking, the processor 204 may autonomously create a convex hull 210 of the workpiece 300 based on the tessellated workpiece collision geometry 218, and may set the convex hull 210 as a keep-out region for the robot 102 when navigating from working waypoint 228 to working waypoint 228. After generating the master plan 222 and prior to registering the robot 102 to the workpiece 300, the processor 204 may autonomously perform a reach check for the robot 102 at each one of the working waypoints 228. In this regard, the processor 204 autonomously loads a kinematic model 124 of the robot 102 into the world map 242, and determines, based on the kinematic model 124, whether the end effector 110 of the robot 102 is capable of reaching all locations along the movement paths 238 associated with each working waypoint 228. If the robotic system 100 includes a plurality of robots 102, then the kinematic model 124 of each unique one of the robots 102 is loaded and used for determining whether the end effector 110 of each robot 102 is capable of reaching all locations along the movement paths 238 of each working waypoint 228 to which the robot 102 is assigned.

Figure 25:
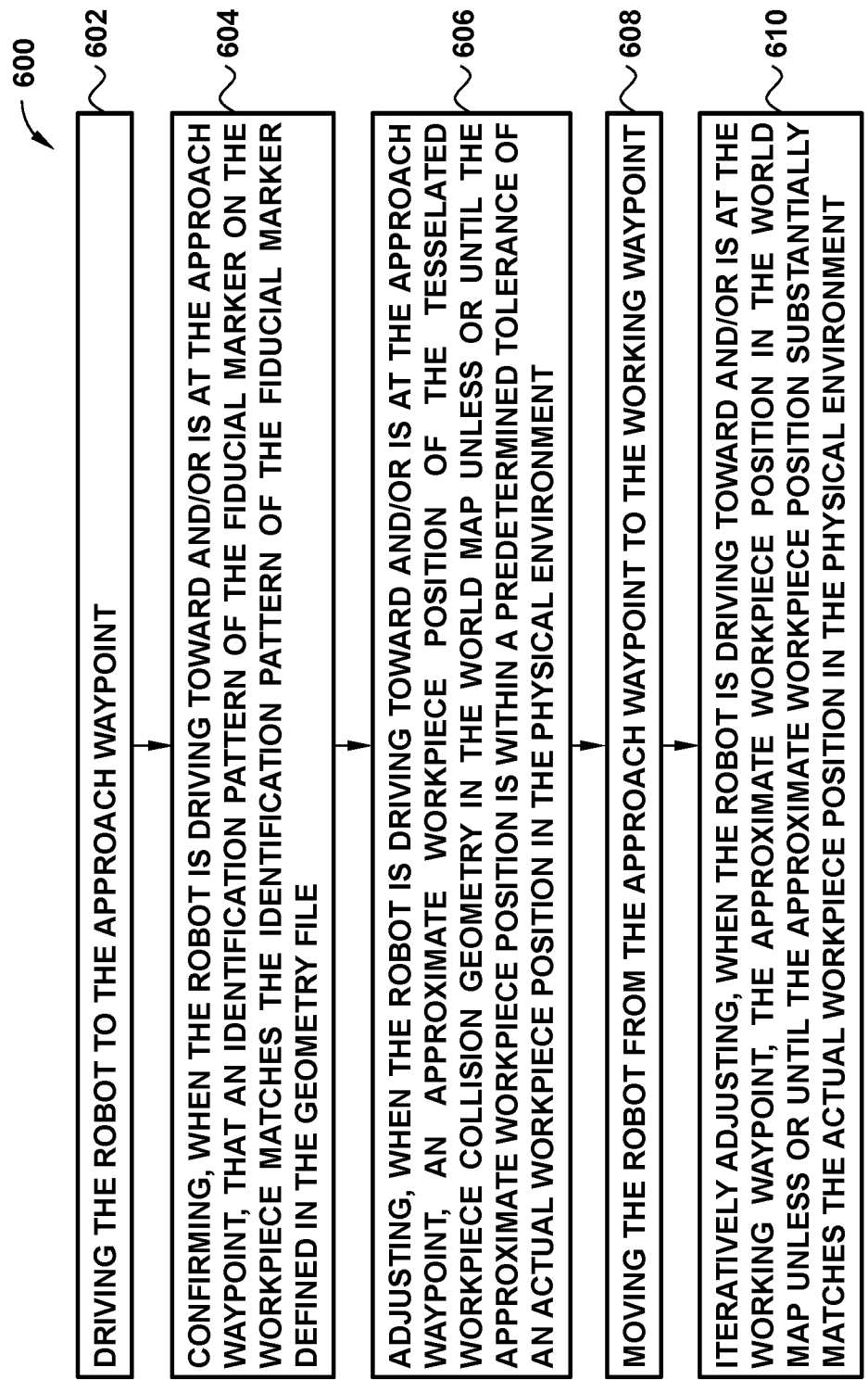
FIG. 25 is a flowchart of operations for registering the robot to the workpiece and adjusting the position of the tessellated workpiece collision geometry within the world map.

Referring to FIG. 25, shown is a flowchart of operations that may be included in a method 600 of registering the robot 102 to the workpiece 300 and adjusting the position of the tessellated workpiece collision geometry 218 within the world map 242 as mentioned in step 406. Step 602 of the method 600 includes driving the robot 102 to the approach waypoint 226 and orienting the robot 102 until the robot centerline (not shown) is approximately parallel to and aligned with a waypoint centerline (not shown) of the approach waypoint 226 as shown in FIGS. 16-17. Step 604 includes confirming, with the robot 102 at the approach waypoint 226, that the identification pattern 318 of the fiducial marker 316 on the workpiece 300 at the approach waypoint 226 matches the identification pattern 318 of the fiducial marker 316 defined in the geometry file 216 and represented in the CAD model 208. If so, then Step 606 includes adjusting the approximate workpiece position 244 of the tessellated workpiece collision geometry 218 within the world map 242 until the approximate workpiece position 244 is within a predetermined initial tolerance of the actual workpiece position 306 in the physical environment 350 as shown in FIG. 17-18 and described above. As mentioned above, the process of detecting, identifying, and matching the fiducial markers 316 on the workpiece 300 to the geometry file 216, and updating (e.g., adjusting) the position of the tessellated workpiece collision geometry 218 within the world map 242 to substantially matches the actual workpiece position 306 in the physical environment 350 may be performed continuously (e.g., in real-time) as the one or more robots 102 navigates around the workpiece 300 such as when driving toward and/or while stationed at any one of the approach waypoints 226 and/or working waypoints 228. In addition, the processor 204 may consider the quality of detection of fiducial markers 316 in determining whether to continue to iteratively adjust the approximate workpiece position 244 within the world map 242. For example, the processor 204 may use Kalman filtering and/or assignment of a confidence value to assess the quality of imaging data (e.g., of fiducial markers 316) as a factor in determining whether or not to initially adjust or continue to adjust (e.g., during an iteration) the approximate workpiece position 244 within the world map 242, as described above.

Step 608 includes autonomously driving the robot 102 from the approach waypoint 226 to the working waypoint 228 as shown in FIGS. 18-19. Step 610 includes iteratively adjusting, with the robot 102 at the working waypoint 228, the position of the tessellated workpiece collision geometry 218 within the world map 242 until the approximate workpiece position 244 of the tessellated workpiece collision geometry 218 within the world map 242 substantially matches the actual workpiece position 306 in the physical environment 350, as shown in FIG. 20.

Figure 26:
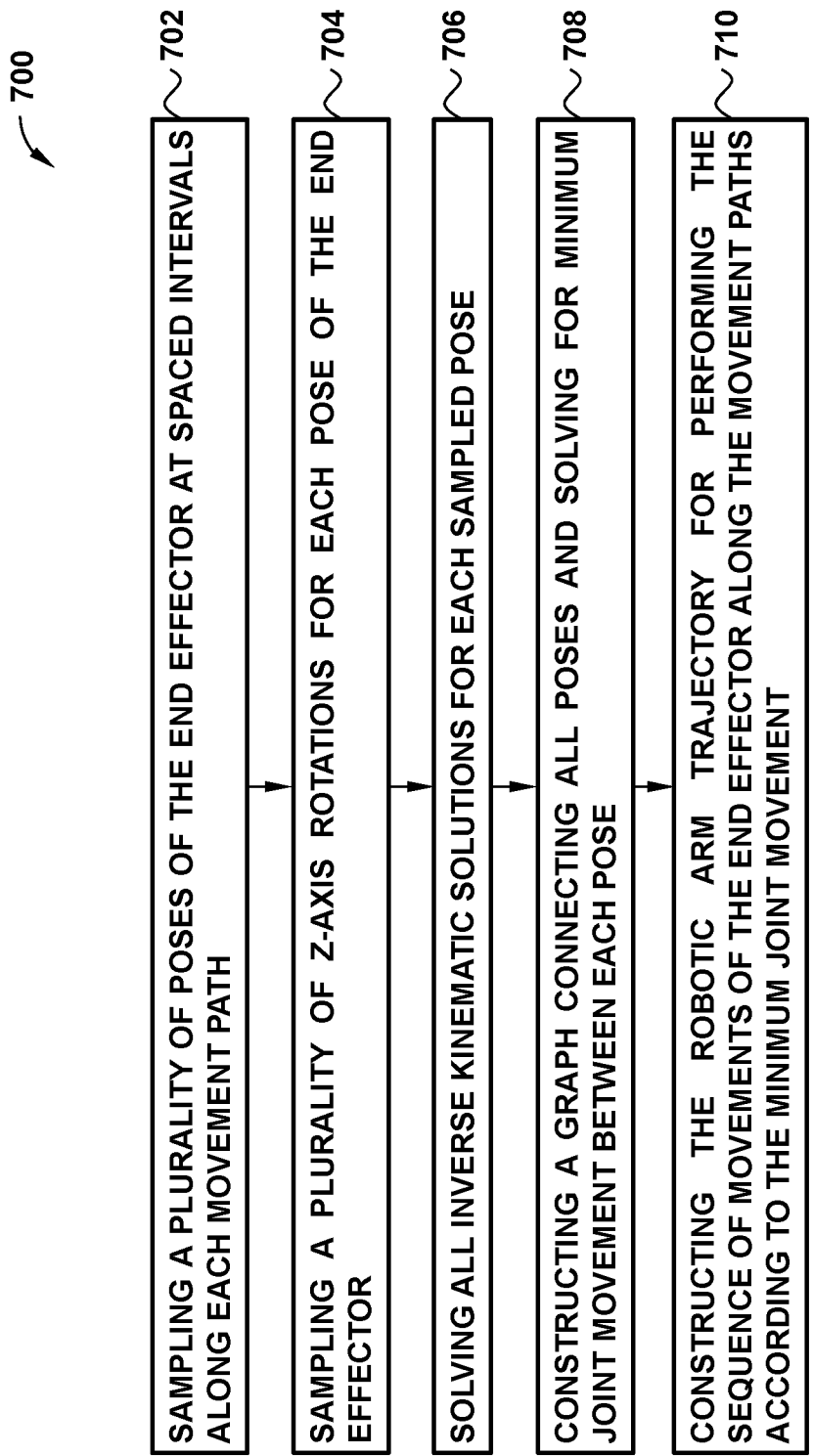
FIG. 26 is a flowchart of operations for constructing a robotic arm trajectory for the robot at a working waypoint.

Referring now to FIG. 26 with additional reference to FIG. 20, shown is a flowchart of operations that may be included in a method 700 of constructing the robotic arm trajectory 240 as mentioned in the step 408. Step 702 of the method 700 may include sampling a plurality of poses (not shown) of the end effector 110 at spaced intervals along each movement path 238. As shown in FIG. 20, the end effector 110 has not yet moved while the robotic arm trajectory 240 is being constructed. Step 704 includes sampling a plurality of z-axis rotations for each pose of the end effector 110. Although not shown, the z-axis of the end effector 110 is oriented locally perpendicular to the operating surface 308 at the location of the pose. Step 706 includes solving all inverse kinematic solutions for each sampled pose as a means to ensure that the end effector 110 is capable of moving to each sampled pose. Step 708 includes constructing a graph (not shown) connecting all poses and solving for minimum joint movement between each pose. Step 710 includes constructing the robotic arm trajectory 240 for performing the sequence of movements of the end effector 110 along the movement paths 238 according to the minimum joint movement. FIG. 21 illustrates the robotic arm 106 executing the robotic arm trajectory 240 causing the end effector 110 to operate on the operating surface 308. After executing the sequence of movements for the movement paths 238 at one of the working waypoints 228, the robot 102 autonomously moves to another (e.g., adjacent) one of the working waypoints 228 defined in the master plan 222. The robot 102 successively drives to each one of the working waypoints 228, constructing and executing the robotic arm trajectory 240 at each working waypoint 228 until the master plan 222 has been executed to completion.

For a robotic system 100 having a plurality of robots 102, the method of autonomously operating on a workpiece 300 is the same as described above for a robotic system 100 having a single robot 102, with the exception that when autonomously generating the master plan 222, the processor 204 divides the master plan 222 into a plurality of child plans 224 for distribution correspondingly to the plurality of robots 102. In addition, the processor 204 uses only a single one of the robots 102 at a first one of the working waypoints 228 to iteratively adjust the position of the tessellated workpiece collision geometry 218 within the world map 242 to substantially match the actual workpiece position 306 in the physical environment 350. The processor 204 may assign the unique set of working waypoints 230 to each one of the plurality of robots 102 based on the waypoint location of the working waypoints 228 relative to one another, based on end effector capability of the end effectors 110 relative to one another, and/or based on robot workload of the robots 102 relative to one another as described above.

The construction of the world map 242 may be performed by manually piloting (e.g., maneuvering) at least one of the plurality of robots 102 along the floor surface 352 of the physical environment 350 while recording, using a sensor system 114 of the robot 102, imaging data comprising the environment boundaries 354 of the physical environment 350 and objects within the environment boundaries 354, and constructing, using the processor 204, the world map 242 based on the imaging data. In addition, the step of generating the world map 242 may include localizing the computer representation 214 of each one of the plurality of robots 102 within the world map 242. In some examples, after generating the master plan 222 and prior to registering the robots 102 to the workpiece 300, the method may include performing a reach check on the robotic arm 106. In this regard, the processor 204 may autonomously load a kinematic model 124 of each unique one of the plurality of robots 102 into the world map 242, and may determine for each robot 102 whether the end effector 110 is capable of reaching all locations along the movement paths 238 associated with each one of the working waypoints 228 to which the robot 102 is assigned.

For a robotic system 100 in which one or more of the robots 102 is collaborative, the method may include stopping the movement of the robotic arm 106 upon the occurrence of an arm stopping condition. As described above, an arm stopping condition may comprise contact of the robotic arm 106 and/or end effector 110 with an object other than the operating surface 308 of the workpiece 300. Alternatively or additionally, the method may include stopping the movement of the mobile base 104 upon occurrence of a base stopping condition which, as described above, comprises detection of an object on a collision course with the mobile base 104. If movement of the robotic arm 106 or mobile base 104 is stopped respectively due to the occurrence of the arm stopping condition or the base stopping condition, the method may include autonomously or manually restarting operation of the robot 102 at the step or phase during which the movement was stopped, or at the next appropriate step or phase following the phase during which the movement was stopped.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. A robotic system for autonomously operating on a workpiece, comprising:
at least one robot communicatively coupled to a data processing system including a processor, and having a robotic arm and an end effector coupled to the robotic arm;
the processor configured to autonomously generate a master plan for movement of the end effector for operating on an operating surface of a workpiece positioned in a physical environment, the master plan being based on a computer aided design (CAD) model of the workpiece and defining movement paths of the end effector based at least in part on a reach distance of the robotic arm of the robot at each of a plurality of working waypoints included in the master plan to correspond to a plurality of fiducial markers mounted on the workpiece and represented in the CAD model;
the processor configured to autonomously perform the following sequence of steps for each one of the fiducial markers:
register the robot to the workpiece in the physical environment when the robot is driving toward and/or is at an approach waypoint in front of a fiducial marker, and iteratively adjust a position of a tessellated workpiece collision geometry within a world map of the physical environment unless or until an approximate workpiece position of the tessellated workpiece collision geometry within the world map substantially matches an actual workpiece position in the physical environment when the robot is driving toward and/or is at the working waypoint corresponding to the fiducial marker;

construct, with the robot at the working waypoint, a robotic arm trajectory for performing a sequence of movements of the end effector along the movement paths associated with the working waypoint; and execute the robotic arm trajectory and cause the end effector to operate on a portion of the operating surface of the workpiece corresponding to the portion of the master plan defined for the robot at the working waypoint.

2. The robotic system of claim 1, wherein the processor, in autonomously generating the master plan, is configured to sequentially perform the following:

construct, based on a geometry file of the CAD model, a plurality of working waypoints respectively at a distance from the fiducial markers based on the reach distance of the robotic arm;

construct at each one of the working waypoints a reach sphere sized in correspondence to the reach distance;

define a plurality of surface segments based on an intersection of each reach sphere with the operating surface determine for each surface segment a cut direction defined as a direction of a largest dimension of the surface segment;

form the movement paths for each surface segment by intersecting each surface segment with a series of vertical planes oriented parallel to the cut direction;

designate, for each working waypoint, alternating directions of movement of the end effector along adjacent movement paths, alternating directions of movement defining a sequence of movements for the end effector; and save the master plan containing the movement paths and the sequence of movements of the end effector at all of the working waypoints.

3. The robotic system of claim 2, wherein the processor is configured to:

define the operating surface of the CAD model of the workpiece, the CAD model having collision geometry;

define the plurality of fiducial markers of the CAD model;

tessellate the collision geometry of the CAD model to form tessellated workpiece collision geometry; and save the geometry file containing at least the definition of the operating surface, the fiducial markers, and the tessellated workpiece collision geometry of the workpiece.

4. The robotic system of claim 1, wherein:

the robot includes a sensor system; and the processor is configured to construct the world map based on imaging data of environment boundaries of the physical environment and objects within the environment boundaries recorded by the sensor system while the robot is piloted along a floor surface of the physical environment.

5. The robotic system of claim 4, wherein the processor is configured to:

position within the world map a tessellated workpiece collision geometry of the workpiece;

create a convex hull of the workpiece based on the tessellated workpiece collision geometry; and set the convex hull as a keep-out region for the robot.

6. The robotic system of claim 1, wherein the processor is configured to:

load a kinematic model of the robot into the world map; and determine, based on the kinematic model, whether the end effector is capable of reaching all locations along the movement paths associated with each working waypoint prior to registering the robot to the workpiece.

7. The robotic system of claim 1, wherein, in registering the robot to the workpiece and adjusting the position of the tessellated workpiece collision geometry within the world map, the processor is configured to sequentially perform the following:

drive the robot to the approach waypoint;

confirm, when the robot is driving toward and/or is at the approach waypoint, that an identification pattern of the fiducial marker on the workpiece matches the identification pattern of the fiducial marker represented in the CAD model;

adjust, when the robot is driving toward and/or is at the approach waypoint, an approximate workpiece position of the tessellated workpiece collision geometry within the world map unless or until the approximate workpiece position is within a predetermined initial tolerance of an actual workpiece position of the workpiece in the physical environment;

move the robot from the approach waypoint to the working waypoint; and iteratively adjust, with the robot at the working waypoint, the position of the tessellated workpiece collision geometry within the world map unless or until the position of the tessellated workpiece collision geometry within the world map substantially matches the actual workpiece position in the physical environment.

8. The robotic system of claim 1, wherein, in constructing the robotic arm trajectory, the processor is configured to sequentially perform the following:

sample a plurality of poses of the end effector at spaced intervals along each movement path;

sample a plurality of z-axis rotations for each pose of the end effector;

solve all inverse kinematic solutions for each sampled pose;

construct a graph connecting all poses and solving for minimum joint movement between each pose; and construct the robotic arm trajectory for performing the sequence of movements of the end effector along the movement paths according to the minimum joint movement.

9. A robotic system for autonomously operating on a workpiece, comprising:

a plurality of robots each having a robotic arm and an end effector coupled to the robotic arm;

at least one processor configured to autonomously generate a master plan for movement of each end effector for operating on an operating surface of a workpiece positioned in a physical environment, the master plan being based on a computer aided design (CAD) model of the workpiece and comprising a plurality of child plans for distribution to the plurality of robots and each defining movement paths of an end effector of one of the robots, the movement paths being based at least in part on a reach distance of a robotic arm of the robot assigned by the child plan to one of more of a unique set of working waypoints included in the master plan, the working waypoints corresponding to a plurality of fiducial markers mounted on the workpiece and represented in the CAD model;

the processor configured to autonomously perform the following:

for each one of the robots, register to the workpiece in the physical environment when driving toward and/or at an approach waypoint in front of a working waypoint of the set of working waypoints assigned to the robot;

for only one of the robots when driving toward and/or at a first one of the working waypoints in the set of working waypoints, iteratively adjust a position of a tessellated workpiece collision geometry within a world map of the physical environment unless or until an approximate workpiece position of the tessellated workpiece collision geometry within the world map substantially matches an actual workpiece position in the physical environment when the robot is driving toward and/or is at the working waypoint;

for each one of the robots when at each working waypoint in the set of working waypoints assigned to the robot:

construct a robotic arm trajectory for performing a sequence of movements of the end effector along the movement paths associated with the working waypoint; and execute the robotic arm trajectory in a manner causing the end effector to operate on a portion of the operating surface corresponding to the portion of the child plan defined for the robot at the working waypoint.

10. The robotic system of claim 9, wherein the processor is configured to assign a set of working waypoints to each one of the plurality of robots based on at least one of the following:

waypoint location of the working waypoints relative to one another;

end effector capability of the end effectors relative to one another; and robot workload of the robots relative to one another.

11. A method of operating on a workpiece:

autonomously generating, using a processor, a master plan for movement of at least one end effector correspondingly of at least one robot for operating on an operating surface of a workpiece in a physical environment, the master plan being based on a computer aided design (CAD) model of the workpiece and defining movement paths of the end effector based at least in part on a reach distance of a robotic arm of the robot at each of a plurality of working waypoints included in the master plan, the plurality of working waypoints corresponding to a plurality of fiducial markers mounted on the workpiece and represented in the CAD model;

autonomously performing, using the processor, the following sequence of steps for the robot at each one of the plurality of working waypoints:

registering the robot to the workpiece in the physical environment when the robot is driving toward and/or is at an approach waypoint in front of a working waypoint, and iteratively adjusting a position of a tessellated workpiece collision geometry within a world map of the physical environment unless or until an approximate workpiece position of the tessellated workpiece collision geometry within the world map substantially matches an actual workpiece position in the physical environment when the robot is driving toward and/or is at the working waypoint;

constructing, with the robot at the working waypoint, a robotic arm trajectory for performing a sequence of movements of the end effector along the movement paths associated with the working waypoint; and executing the robotic arm trajectory in a manner causing the end effector to operate on a portion of the operating surface corresponding to the portion of the master plan defined for the robot at the working waypoint.

12. The method of claim 11, wherein the step of autonomously generating the master plan comprises:

constructing, based on a geometry file of the CAD model, the plurality of working waypoints respectively at a distance from the fiducial markers based on the reach distance of the robotic arm;

constructing at each one of the working waypoints a reach sphere sized in correspondence to the reach distance;

defining a plurality of surface segments based on an intersection of each reach sphere with the operating surface;

determining for each surface segment a cut direction defined as a direction of a largest dimension of the surface segment;

forming the movement paths for each surface segment by intersecting each surface segment with a series of vertical planes oriented approximately parallel to the cut direction;

designating, for each working waypoint, alternating directions of movement of the end effector along adjacent movement paths, alternating directions of movement defining a sequence of movements for the end effector at each working waypoint; and saving the master plan containing the movement paths and the sequence of movements of the end effector at all of the working waypoints.

13. The method of claim 12, further including:

defining the operating surface of the CAD model of the workpiece, the CAD model having collision geometry;

defining the plurality of fiducial markers of the CAD model;

tessellating the collision geometry of the CAD model to form tessellated workpiece collision geometry; and generating the geometry file by saving a definition of the operating surface, the fiducial markers, and the tessellated workpiece collision geometry of the workpiece.

14. The method of claim 11, further comprising constructing the world map by performing the steps of:

piloting the robot along a floor surface of the physical environment while recording, using a sensor system of the robot, imaging data of environment boundaries of the physical environment and objects within the environment boundaries; and constructing, using the processor, the world map based on the imaging data.

15. The method of claim 14, wherein after constructing the world map, the method further includes:

positioning, within the world map, tessellated workpiece collision geometry of the workpiece;

creating a convex hull of the workpiece based on the tessellated workpiece collision geometry; and setting the convex hull as a keep-out region for the robot.

16. The method of claim 11, wherein after generating the master plan and prior to registering the robot to the workpiece, the method includes:
  loading a kinematic model of the robot into the world map; and
  determining, based on the kinematic model, whether the end effector is capable of reaching all locations along the movement paths associated with each working waypoint.

17. The method of claim 11, wherein the step of registering the robot to the workpiece and adjusting the position of the tessellated workpiece collision geometry within the world map comprises sequentially performing the following:
  driving the robot to the approach waypoint;
  confirming, when the robot is driving toward and/or is at the approach waypoint, that an identification pattern of the fiducial marker on the workpiece matches the identification pattern of the fiducial marker represented in the CAD model;
  adjusting, when the robot is driving toward and/or is at the approach waypoint, an approximate workpiece position of the tessellated workpiece collision geometry within the world map until the approximate workpiece position is within a predetermined initial tolerance of an actual workpiece position in the physical environment;
  moving the robot from the approach waypoint to the working waypoint; and
  iteratively adjusting, when the robot is driving toward and/or is at the working waypoint, the approximate workpiece position of the tessellated workpiece collision geometry within the world map until the approximate workpiece position within the world map substantially matches the actual workpiece approximate workpiece position in the physical environment.

18. The method of claim 11, wherein the step of constructing the robotic arm trajectory comprises:
  sampling a plurality of poses of the end effector at spaced intervals along each movement path;
  sampling a plurality of z-axis rotations for each pose of the end effector;
  solving all inverse kinematic solutions for each sampled pose;
  constructing a graph connecting all poses and solving for minimum joint movement between each pose; and
  constructing the robotic arm trajectory for performing the sequence of movements of the end effector along the movement paths according to the minimum joint movement.

19. A method of autonomously operating on a workpiece, comprising:
  autonomously generating, using a processor, a master plan for movement of a plurality of end effectors of a corresponding plurality of robots configured to operate on different surface segments of an operating surface of a workpiece positioned in a physical environment, the master plan being based on a computer aided design (CAD) model of the workpiece and comprising a plurality of child plans for distribution correspondingly to the plurality of robots and each defining movement paths of an end effector of one of the robots, the movement paths being based at least in part on a reach distance of a robotic arm of the robot assigned by the child plan to operate from a unique set of working waypoints included in the master plan, the working waypoints corresponding to a plurality of fiducial markers mounted on the workpiece and represented in the CAD model;
  autonomously performing, using the processor, the following:
    registering each one of the robots to the workpiece in the physical environment when the robot is driving toward and/or is at an approach waypoint in front of a working waypoint of the set of working waypoints assigned to the robot,
    iteratively adjusting, for only one of the robots when driving toward and/or at a first one of the working waypoints in the set of working waypoints, an approximate workpiece position of a tessellated workpiece collision geometry within a world map of the physical environment unless or until the approximate workpiece position within the world map substantially matches an actual workpiece position in the physical environment when the robot is driving toward and/or is at the working waypoint;
    constructing, for each one of the robots when at each working waypoint in the set of working waypoints assigned to the robot, a robotic arm trajectory for performing a sequence of movements of the end effector along the movement paths associated with the working waypoint; and
    executing, for each one of the robots when at each working waypoint in the set of working waypoints assigned to the robot, the robotic arm trajectory in a manner causing the end effector to operate on a portion of the operating surface corresponding to the portion of the child plan defined for the robot at the working waypoint.

20. The method of claim 19, further including the step of:
  assigning a unique set of working waypoints to each one of the plurality of robots based on at least one of the following:
    a waypoint location of the working waypoints relative to one another;
    an end effector capability of the end effectors relative to one another; and
    a robot workload of the robots relative to one another.

* * * * *